(12) United States Patent
Yang et al.

(10) Patent No.: US 11,502,557 B2
(45) Date of Patent: Nov. 15, 2022

(54) WIRELESS CHARGING CONTROL METHOD AND CHARGING CONTROL DEVICE

(71) Applicant: GUANGDONG OPPO MOBILE TELECOMMUNICATIONS CORP., LTD., Guangdong (CN)

(72) Inventors: Jun Yang, Guangdong (CN); Shiming Wan, Guangdong (CN); Shangbo Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/378,148

(22) Filed: Jul. 16, 2021

(65) Prior Publication Data

US 2021/0344236 A1  Nov. 4, 2021

Related U.S. Application Data

(63) Continuation of application No. PCT/CN2019/072422, filed on Jan. 18, 2019.

(51) Int. Cl.
*H02J 50/80* (2016.01)
*H02J 50/12* (2016.01)
(Continued)

(52) U.S. Cl.
CPC .............. *H02J 50/80* (2016.02); *H02J 7/02* (2013.01); *H02J 50/12* (2016.02); *H04B 5/0037* (2013.01); *H04B 5/0081* (2013.01)

(58) Field of Classification Search
CPC .............. H02J 50/00; H02J 50/80; H04B 5/00
See application file for complete search history.

(56) References Cited

U.S. PATENT DOCUMENTS

| 9,438,067 B2 * | 9/2016 | Na | H02J 50/80 |
| 2015/0061578 A1 * | 3/2015 | Keeling | H02J 50/80 320/108 |

(Continued)

FOREIGN PATENT DOCUMENTS

| CN | 203787984 | 8/2014 |
| CN | 108075578 | 5/2018 |

(Continued)

OTHER PUBLICATIONS

EPO, Extended European Search Report for EP Application No. 19910815.0, dated Nov. 26, 2021.
(Continued)

*Primary Examiner* — Adi Amrany
(74) *Attorney, Agent, or Firm* — Hodgson Russ LLP

(57) ABSTRACT

Provided are a wireless charging control method, a charging control device and a device to-be-charged. The method includes: according to an output voltage of a wireless receiving circuit, determining whether a power of a wireless charging signal received by the wireless receiving circuit can meet a charging power currently required by a battery; and when the power of the wireless charging signal fails to meet the charging power currently required by the battery, reducing the charging power currently required by the battery. In the embodiments, the output voltage of the wireless receiving circuit serves as the basis for determining whether the power of the wireless charging signal can meet the charging power currently required by the battery; and the difference between the charging power received by and required by the battery is decreased by reducing the charging power currently required by the battery.

16 Claims, 4 Drawing Sheets

(51) Int. Cl.
*H02J 7/02* (2016.01)
*H04B 5/00* (2006.01)

(56) References Cited

U.S. PATENT DOCUMENTS

| 2016/0218520 | A1 | 7/2016 | Mehas et al. | |
|---|---|---|---|---|
| 2016/0352155 | A1 | 12/2016 | Iwasaki | |
| 2017/0222469 | A1* | 8/2017 | Tustin | H02J 7/025 |
| 2019/0148986 | A1* | 5/2019 | Yoo | H02J 50/40 |
| | | | | 307/104 |

FOREIGN PATENT DOCUMENTS

| CN | 108233545 | | 6/2018 | | |
|---|---|---|---|---|---|
| CN | 108282000 | | 7/2018 | | |
| CN | 108337919 | | 7/2018 | | |
| CN | 108988511 | | 12/2018 | | |
| EP | 3872950 | A1 * | 9/2021 | ............. | H02J 50/10 |
| WO | 2018184428 | | 10/2018 | | |

OTHER PUBLICATIONS

WIPO, International Search Report and Written Opinion for PCT/CN2019/072422, dated Oct. 17, 2019.

* cited by examiner

WIRELESS CHARGING CONTROL METHOD AND CHARGING CONTROL DEVICE

CROSS-REFERENCE TO RELATED APPLICATION

This application is a continuation of International Application No. PCT/CN2019/072422, filed Jan. 18, 2019, the entire disclosure of which is incorporated herein by reference.

TECHNICAL FIELD

This disclosure relates to the field of wireless charging, and particularly to a wireless charging control method and a charging control device.

BACKGROUND

For a device to-be-charged, a charging cable is required when adopting a wired charging approach, which leads to cumbersome operations in the charging preparation stage. In contrast, a wireless charging approach is attracting more and more people. And more and more devices to-be-charged support functions such as wireless charging or wireless transmission.

However, when the wireless charging approach is adopted to charge the device to-be-charged, the wireless charging dock and the device to-be-charged may be misaligned with each other, which causes most of the wireless charging signals emitted by the wireless charging dock not to be received by the device to-be-charged, resulting in low charging efficiency. In addition, if insufficient charging power is provided to the device to-be-charged, the device to-be-charged occupies the communication channel to request power all the time, resulting in a waste of the channel resources. Therefore, it has become an urgent problem to be solved in the process of wireless charging of how to determine whether the device to-be-charged is misaligned and how to alleviate the waste of channel resources.

DETAILED DESCRIPTION OF PREFERRED EMBODIMENTS

Figure 1:
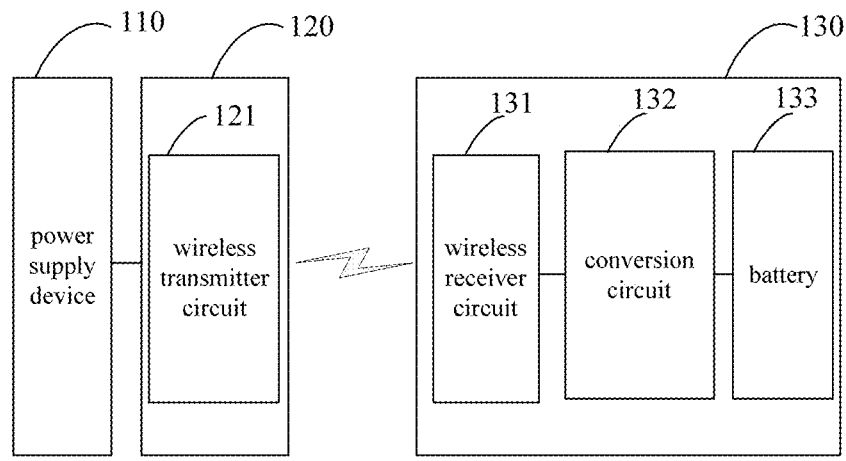
FIG. 1 is a schematic diagram illustrating a wireless charging system.

In the related wireless charging technology, a power supply device (such as an adapter) is generally connected with a wireless charging device (such as a wireless charging dock), and the wireless charging device transmits the output power of the power supply device wirelessly (for example, in the form electromagnetic waves) to the device to-be-charged, so as to wirelessly charge the device to-be-charged.

In the light of different principles of wireless charging, there are mainly three wireless charging methods, i.e., magnetic coupling (or electromagnetic induction) type, electromagnetic resonance type and radio wave type wireless charging. And at present, the prevailing standards for wireless charging include Qi standard, Power Matters Alliance (PMA) standard, and Alliance for Wireless Power (A4WP) standard. Among them, both the Qi standard and the PMA standard direct at the magnetic coupling type wireless charging, and the A4WP standard directs at the electromagnetic resonance type wireless charging.

In the embodiments of the disclosure, a wireless charging control method is provided. In which, an output voltage of a wireless receiver circuit and a wireless charging signal received by the wireless receiver circuit are acquired, and a first charging power of a battery is acquired, the first charging power of the battery being a charging power currently required by the battery. The first charging power of the battery is reduced, in response to determining, according to the output voltage of the wireless receiver circuit, that a power of the wireless charging signal fails to meet the first charging power of the battery.

Furthermore, a charging control device is provided, which includes a wireless receiver circuit configured to receive a wireless charging signal, and a control circuit. The control circuit is configured to: determine, according to an output voltage of the wireless receiver circuit, whether a power of the wireless charging signal can meet a first charging power of a battery, the first charging power of the battery being a charging power currently required by the battery; and reduce the first charging power of the battery, in response to determining that the power of the wireless charging signal fails to meet the first charging power of the battery.

Furthermore, another charging control device is provided, which includes a wireless receiver circuit, a detection circuit, a battery and a communication control circuit. The wireless receiver circuit is configured to receive a wireless charging signal. The detection circuit is configured to detect an output voltage of the wireless receiver circuit, the output voltage of the wireless receiver circuit being converted from the wireless charging signal. The battery is configured to be charged by the output voltage of the wireless receiver circuit. The communication control circuit is configured to: compare the output voltage of the wireless receiver circuit with a target voltage, the target voltage indicating an output voltage of the wireless receiver circuit that enables a first charging power of the battery to be met, the first charging power of the battery being a charging power currently required by the battery; and reduce the first charging power of the battery, in response to determining that the output voltage of the wireless receiver circuit is less than the target voltage for a preset period of time.

In the technical solutions provided by the present disclosure, the output voltage of the wireless receiver circuit serves as a basis for determining whether the power of the wireless charging signal can meet the charging power currently required by the battery. That is, according to the output voltage of the wireless receiver circuit, it can be determined whether the device to-be-charged is misaligned. And when it is determined that the device to-be-charged is misaligned, the charging power currently required by the battery is reduced. After the charging power required by the battery is reduced, the difference between the charging power received by the battery and the charging power required by the battery is reduced, which is beneficial to alleviate the situation that the device to-be-charged continuously request power when being misaligned, and thus reduce the occupation of channel resources.

In the following, a wireless charging method according to an embodiment will be introduced in conjunction with FIG. 1.

As shown in FIG. 1, a wireless charging system includes a power supply device 110, a wireless charging signal transmitting device 120, and a charging control device 130. The transmitting device 120 may be, for example, a wireless charging dock. The charging control device 130 may be a device to-be-charged, and it may be for example a terminal.

After the power supply device 110 is connected with the transmitting device 120, the output voltage and output current of the power supply device 110 are transmitted to the transmitting device 120.

The transmitting device 120 may convert, by means of an internal wireless transmitter circuit 121, the output voltage and output current of the power supply device 110 into a wireless charging signal (for example, an electromagnetic signal) for transmission. For example, the wireless transmitter circuit 121 may convert the output current of the power supply device 110 into an alternating current power, and convert, by means of a transmitting coil or a transmitting antenna, the alternating current power into a wireless charging signal.

FIG. 1 just exemplarily illustrates a schematic structural diagram of the wireless charging system, but the embodiments of the present disclosure are not limited thereto. For example, the transmitting device 120 may also be a wireless charging signal transmitting device, and the charging control device 130 may also be a wireless charging signal receiving device. The wireless charging signal receiving device may be, for example, a chip with a function of receiving wireless charging signals, and may receive the wireless charging signal transmitted by the transmitting device 120. The wireless charging signal receiving device may also be a device to-be-charged.

The device to-be-charged includes, but is not limited to, a device that receives and sends communication signals via a wired line (for example, via Public Switched Telephone Network (PSTN), Digital Subscriber Line (DSL), a digital cable or direct cable connection, and/or via another data connection/network) and/or via a wireless interface (for example, a wireless interface for cellular network, Wireless Local Area Network (WLAN), digital TV network such as Digital Video Broadcasting Handheld (DVB-H) network, satellite network, or Amplitude Modulation-Frequency Modulation (AM-FM) broadcast transmitter, and/or a wireless interface of another communication terminal). The terminal configured to communicate via a wireless interface may be referred to as a "wireless communication terminal", a "wireless terminal" and/or a "mobile terminal". Examples of the mobile terminal include, but are not limited to, satellites or cellular phones; Personal Communication System (PCS) terminals that can combine cellular radio phones with data processing, faxing and data communication capabilities; Personal digital assistants (PDA) that can incorporate a radio phone, a pager, Internet/intranet accessing, a web browser, a memo pad, calendar and/or a Global Positioning System (GPS) receiver; and conventional laptop and/or handheld receiver or other electronic device including a radio phone transceiver. In some embodiments, the device to-be-charged may refer to a mobile terminal device or a handheld terminal device, such as a mobile phone and a pad. In some embodiments, the device to-be-charged mentioned in the embodiments of this disclosure may refer to a chip system. In this embodiment, the battery of the device to-be-charged may or may not belong to the chip system.

In addition, the device to-be-charged may also include other electronic devices that require charging, such as e-books, wireless headsets, smart wearable devices, on-board devices, portable power sources (such as a portable charger and a travel charger), electronic cigarettes, wireless mice, Bluetooth speakers, and household appliances that require charging, such as desk lamps, desks and electric toothbrushes.

In the following, it is described by taking the wireless charging signal transmitting device and the device to-be-charged as an example.

The charging control device 130 may receive, through a wireless receiver circuit 131, the wireless charging signal transmitted by the wireless transmitter circuit 121, and convert the wireless charging signal into output voltage and output current of the wireless receiver circuit 131. For example, the wireless receiver circuit 131 may convert, by means of a receiving coil or a receiving antenna, the wireless charging signal transmitted by the wireless transmitter circuit 121 into an alternating current power, and perform operations such as rectification and/or filtering on the alternating current power, to convert the alternating current power into the output voltage and output current of the wireless receiver circuit 131.

In some implementations, before the wireless charging, the transmitting device 120 and the charging control device 130 negotiate the transmit power of the wireless transmitter circuit 121 in advance. Assuming that the transmit power negotiated by the transmitting device 120 and the charging control device 130 is 5 W, the output voltage and the output current of the wireless receiver unit 131 are generally 5V and 1 A, respectively. Assuming that the transmit power negotiated by the transmitting device 120 and the charging control device 130 is 10.8 W, the output voltage and the output current of the wireless receiver unit 131 are generally 9V and 1.2 A, respectively.

If the output voltage of the wireless receiver circuit 131 is not suitable for being directly applied to two ends of a battery 133, it is necessary for a conversion circuit 132 in the charging control device 130 to perform constant voltage and/or constant current control on the output voltage of the wireless receiver circuit, to obtain a charging voltage and/or charging current desired by the battery 133 of the charging control device 130.

The conversion circuit 132 may be configured to convert the output voltage of the wireless receiver circuit 131 in such a manner that the output voltage and/or output current of the conversion circuit 132 meets the charging voltage and/or charging current desired by the battery 133.

As an example, the conversion circuit 132 may be, for example, a charging integrated circuit (IC), or may be a power management circuit. During the process of charging the battery 133, the conversion circuit 132 may be configured to manage the charging voltage and/or charging current of the battery 133. The conversion circuit 132 may incorporate a voltage feedback function and/or a current feedback function, so as to manage the charging voltage and/or charging current of the battery 133.

In some embodiments, the process of charging the battery may include one or more of a trickle charging phase, a constant current charging phase and a constant voltage charging phase. In the trickle charging phase, the conversion circuit 132 may utilize the current feedback function to make the current entering the battery 133 during the trickle charging phase meet the charging current desired by the battery 133 (for example, a first charging current). During the constant current charging phase, the conversion circuit 132 may utilize the current feedback function to make the current entering the battery 133 during the constant current charging phase meet the charging current desired by the battery 133 (for example, a second charging current, which may be greater than the first charging current). In the constant voltage charging phase, the conversion circuit 132 may utilize the voltage feedback function to make the voltage applied to both ends of the battery 133 during the constant voltage charging phase meet the charging voltage desired by the battery 133.

As an example, when the output voltage of the wireless receiver circuit 131 is greater than the charging voltage desired by the battery 133, the conversion circuit 132 may be configured to perform step-down processing on the output voltage of the wireless receiver circuit 131, so as to make the charging voltage obtained after the step-down conversion meet the charging voltage desired by the battery 133. As another example, when the output voltage of the wireless receiver circuit 131 is less than the charging voltage desired by the battery 133, the conversion circuit 132 may be configured to perform boost processing on the output voltage of the wireless receiver circuit 131, so as to make the charging voltage obtained after the boost conversion meet the charging voltage desired by the battery 133.

As another example, taking a case where the wireless receiver circuit 131 outputs a constant voltage of 5V as an example, when the battery 133 includes a single cell, the conversion circuit 132 (for example, a Buck converter) may perform step-down processing on the output voltage of the wireless receiver circuit 131, so as to make the charging voltage obtained after the step-down processing meet the charging voltage desired by the battery 133.

As another example, taking the case where the wireless receiver circuit 131 outputs a constant voltage of 5V as an example, when the battery 133 includes two or more cells connected in series, the conversion circuit 132 (such as a Boost converter) may perform boost processing on the output voltage of the wireless receiver circuit 131, so as to make the charging voltage obtained after the boost processing meet the charging voltage desired by the battery 133.

In a normal charging process, the charging voltage and/or charging current required by the battery may change at different charging phases. The output voltage and/or output current of the wireless receiver circuit may need to be continuously adjusted to meet the current charging requirement of the battery. During the process of charging the battery, since the voltage of the battery may be kept substantially stable for a period of time, the charging voltage of the battery may remain unchanged. As the charging current required by the battery continuously increases, the charging power required by the battery also continuously increases. When the charging power required by the battery increases, the wireless receiver circuit needs to increase the output power thereof to meet the charging requirement of the battery.

When the output power of the wireless receiver circuit is less than the charging power currently required by the battery, a communication control circuit may send, to the transmitting device, instruction information to instruct the transmitting device to increase the transmit power, so as to increase the output power of the wireless receiver circuit. Therefore, during the charging process, the communication control circuit may communicate with the transmitting device, so that the output power of the wireless receiver circuit can be enabled to meet the charging requirement of the battery at different charging phases.

Normally, the transmitting device may increase the transmit power thereof so as to make the charging requirement of the battery met. However, when the device to-be-charged is charged by the wireless charging signal transmitting device, the device to-be-charged may be misaligned, that is, the receiving coil of the device to-be-charged is not aligned with the transmitting coil of the transmitting device and thus there is a certain amount of displacement or offset. In this case, the wireless charging signal transmitted by the transmitting coil cannot be completely received by the receiving coil, resulting in a decrease in the charging efficiency.

In addition, as the charging efficiency is decreased, the charging power received by the device to-be-charged is less than the charging power transmitted by the transmitting device. Furthermore, the charging power transmitted by the transmitting device has an upper limit, and if the charging requirement of the battery still cannot be met when the transmit power of the transmitting device reaches the upper limit, the device to-be-charged continuously requires the transmitting device to provide more power. Specifically, the device to-be-charged continuously sends the instruction information to the transmitting device to instruct the transmitting device to increase the output power. However, the transmit power of the transmitting device has reached the upper limit and cannot be increased anymore. Therefore, even if the device to-be-charged continuously requests to increase the power, the transmitting device still cannot meet the charging requirement of the device to-be-charged. Also, since the device to-be-charged continuously occupies the channel resource to request for increase of the transmit power, the waste of channel resources is also caused. Further, if the device to-be-charged continuously occupies the channel resources, the foreign object debris (FOD) detection is caused not to be performed normally, thereby affecting the FOD function.

Therefore, there is an urgent need for a detection method for avoiding the phenomenon that the device to-be-charged occupies the channel resources due to the misalignment. The embodiments of the present disclosure provide a wireless charging control method, by which the waste of channel resources during the wireless charging can be alleviated.

Figure 2:
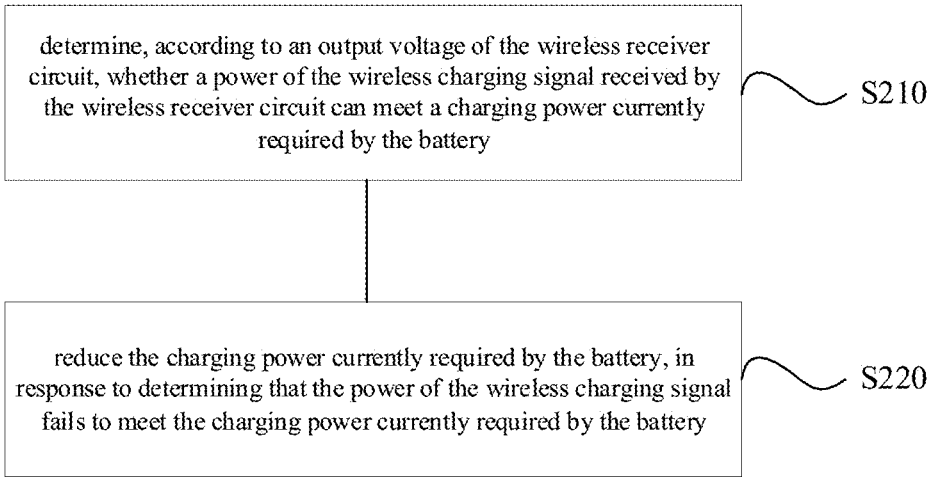
FIG. 2 is a schematic flowchart of a wireless charging control method provided by an embodiment of the present disclosure.

FIG. 2 is a schematic flowchart of a wireless charging control method provided by the embodiments of the present disclosure. The method shown in FIG. 2 includes operations S210 and S220.

In S210, it is determined, according to an output voltage of the wireless receiver circuit, whether a power of the wireless charging signal received by the wireless receiver circuit can meet a charging power currently required by the battery.

In the process of charging the battery, the charging power of the wireless receiver circuit usually needs to match the charging power currently required by the battery, that is, the charging power of the wireless receiver circuit needs to meet the charging power currently required by the battery. In this way, the device to-be-charged can charge the battery according to the charging power required by the battery.

During the wireless charging process, the output current of the wireless receiver circuit generally remains unchanged. For example, the output current of the wireless receiver circuit is generally the same as the input current of the wireless transmitter circuit. Therefore, the output power of the wireless receiver circuit may be reflected by the output voltage of the wireless receiver circuit. The output power of the wireless receiver circuit may be understood as the power of the wireless charging signal received by the wireless receiver circuit. Further, the output voltage of the wireless receiver circuit may be used to determine whether the output power of the wireless receiver circuit can meet the charging power currently required by the battery.

In S220, the charging power currently required by the battery is reduced, in response to determining that the power of the wireless charging signal fails to meet the charging power currently required by the battery.

As mentioned above, when the power of the wireless charging signal fails to meet the charging power currently required by the battery, the device to-be-charged may continuously request the wireless charging signal transmitting device to increase the transmit power so as to meet the current charging requirement of the battery. However, there are some special situations, for example, in a case where the device to-be-charged is misaligned, even if the device to-be-charged continuously requests to increase the transmit power, the transmit power of the transmitting device cannot be increased anymore since it has already reached its maximum value. That is, the request of the device to-be-charged is futile. However, the continuous sending of the request from the device to-be-charged to the transmitting device would always occupies the communication channel, resulting in a waste of channel resources, and also affecting the FOD function of the device to-be-charged.

In the technical solution provided by the embodiments of the present disclosure, if the power of the wireless charging signal fails to meet the charging power currently required by the battery, the charging power currently required by the battery may be reduced. After the charging power currently required by the battery is reduced, the difference between the charging power received by the battery and the charging power currently required by the battery is decreased; and thus it is possible that the charging power received by the battery is equal to the charging power currently required by the battery, that is, the charging power transmitted by the transmitting device can meet the charging power currently required by the battery. When the charging power transmitted by the transmitting device meets the current charging requirement of the battery, the device to-be-charged does not request the transmitting device to increase the charging power, and therefore the channel resource is not occupied, which can reduce the waste of channel resources.

It is understandable that, when the power of the wireless charging signal fails to meet the charging power currently required by the battery, it may mean that the device to-be-charged is misaligned. Therefore, the technical solution provided by the embodiments of the present disclosure can also detect whether the device to-be-charged is misaligned.

In some implementations, determining whether the device to-be-charged is misaligned is performed by detecting the frequency (or resonant frequency) of the wireless charging signal. When the device to-be-charged is misaligned, the transmit power of the transmitting device fails to meet the charging requirement of the device to-be-charged, and then the transmitting device changes the transmitting frequency of the wireless charging signal to adjust the transmit voltage of the transmitting device. Therefore, the frequency of the wireless charging signal may be detected to determine whether the device to-be-charged is misaligned. However, this method is only suitable for variable frequency charging, and it is not suitable for wireless charging with a fixed frequency. Nonetheless, in the technical solution provided by the embodiments of the present disclosure, the output voltage of the wireless receiver circuit is utilized to determine whether the device to-be-charged is misaligned, which can be applied to the case where the device to-be-charged is charged at a fixed frequency; of course, it can also be applied to the case where the device to-be-charged is charged at a variable frequency.

In the method provided by the embodiments of the present disclosure, after the device to-be-charged is determined to be misaligned, in addition to improving the wireless charging process by reducing the charging power currently required by the battery, the user can also be prompted to make the device to-be-charged aligned so as to better charging the battery. For example, prompt information may be displayed on an interface of the device to-be-charged, or an alarm tone may be sent, or an indicator light may be instructed to flash, so that the user can be prompted to make the device to-be-charged aligned.

There are many ways to implement the operation 210, which is not specifically limited in the embodiments of the present disclosure.

As an example, the output power of the wireless receiver circuit may be determined according to the output voltage and output current of the wireless receiver circuit, and then it is determined, according to the difference between the output power of the wireless receiver circuit and a target power, whether the power of the wireless charging signal received by the wireless receiver circuit can meet the charging power currently required by the battery. If the output power of the wireless receiver circuit is greater than or equal to the target power, it may be determined that the power of the wireless charging signal received by the wireless receiver circuit can meet the charging power currently required by the battery; and if the output power of the wireless receiver circuit is less than the target power, it may be determined that the power of the wireless charging signal received by the wireless receiver circuit fails to meet the charging power currently required by the battery.

As another example, it may be determined, according to the output voltage of the wireless receiver circuit and a target voltage, whether the power of the wireless charging signal received by the wireless receiver circuit can meet the charging power currently required by the battery. If the output voltage of the wireless receiver circuit is greater than or equal to the target voltage, it may be determined that the power of the wireless charging signal received by the wireless receiver circuit can meet the charging power currently required by the battery; and if the output voltage of the wireless receiver circuit is less than the target voltage, it may be determined that the power of the wireless charging signal received by the wireless receiver circuit fails to meet the charging power currently required by the battery.

Optionally, if the power of the wireless charging signal fails to reach the charging power currently required by the battery for a preset period of time, it may be determined that the power of the wireless charging signal fails to meet the charging power currently required by the battery. The preset period of time may be for example 30 seconds or 1 minute.

If the power of the wireless charging signal still fails to reach the charging power currently required by the battery for the preset period of time, this may show that the power of the wireless charging signal after being adjusted still fails to reach the charging power required by the battery. For example, within this preset period of time, if the output power of the wireless receiver circuit still does not reach the charging power required by the battery after the wireless receiver circuit communicates with the transmitting device, it may be determined that the charging power of the wireless charging signal fails to meet the charging power required by the battery.

The target voltage may be an output voltage of the wireless receiver circuit that is currently desired by the battery. In other words, the target voltage may be an output voltage of the wireless receiver circuit that matches the charging voltage and/or charging current currently required by the battery, i.e., it enables the charging power currently required by the battery to be met.

When the actual output voltage of the wireless receiver circuit does not reach the target voltage, instruction information may be sent to the transmitting device to instruct the transmitting device to increase the transmit voltage thereof. After the transmitting device is instructed to increase the transmit voltage, if the output voltage of the wireless receiver circuit still fails to reach the target voltage, it may be determined that the power of the wireless charging signal fails to meet the charging power currently required by the battery.

After the transmitting device is instructed to increase the transmit voltage, if the output voltage of the wireless receiver circuit still fails to reach the target voltage, it may be determined that the transmit voltage of the transmitting device has reached the maximum and cannot be increased anymore, and that the output voltage of the wireless receiver circuit fails to meet the charging power required by the battery; accordingly, the charging power required by the battery may be reduced.

If the instruction information to increase the transmit voltage is sent to the transmitting device only once, and the transmitting device increases the transmit voltage in response to the instruction information, but the increased transmit voltage still cannot make the output voltage of the wireless receiver circuit reach the target voltage, this does not show that the transmit voltage of the transmitting device cannot be increased anymore. There may be a case where the transmitting device increases the transmit voltage only by a certain amount in response to one communication. Therefore, the transmitting device may be instructed for many times to increase the transmit voltage. For example, the instruction information may be sent to the transmitting device at least twice to instruct the transmitting device to increase the transmit voltage. Under normal circumstances, after the transmitting device is instructed for many times to increase the transmit voltage, the output voltage of the wireless receiver circuit can reach the target voltage. However, if the output voltage of the wireless receiver circuit still fails to reach the target voltage after the transmitting device is instructed for many times to increase the transmit voltage, it may be determined that the device to-be-charged is misaligned, and then it is determined that the power of the wireless charging signal fails to meet the charging power currently required by the battery. In this way, the accuracy of the determination can be improved.

During the wireless charging process, the charging voltage and/or charging current required by the battery may change, which may cause the charging voltage and/or charging current required by the battery to increase. Thus, there may be a moment at which the output voltage of the wireless receiver circuit does not reach the target voltage, but this is not caused by the misalignment of the device to-be-charged. In fact, in this case, the output voltage of the wireless receiver circuit can continue to be increased; therefore, the transmitting device may be instructed to increase the transmit voltage. If the output voltage of the wireless receiver circuit can reach the target voltage after the transmitting device is instructed to increase the transmit voltage, the charging of the battery is continued. If the output voltage of the wireless receiver circuit still fails to reach the target voltage after the transmitting device is instructed for many times to increase the transmit voltage, it shows that the transmit power of the transmitting device has reached the maximum and cannot be increased anymore; and then it may be determined that the power of the wireless charging signal fails to meet the charging power currently required by the battery, and the charging power currently required by the battery may be reduced accordingly. In this way, the accuracy of the determination can be improved.

Of course, in addition to the above implementations, when the actual output voltage of the wireless receiver circuit does not reach the target voltage, it may also be directly determined that the power of the wireless charging signal fails to meet the charging power currently required by the battery, which is not specifically limited in this embodiments of the disclosure.

With regard to the contents of the instruction information, the embodiments of the disclosure do not make specific limitation thereto. For example, the instruction information may directly indicate the output voltage of the wireless receiver circuit, or the instruction information may indicate the difference between the target voltage and the output voltage of the wireless receiver circuit, or the instruction information may indicate the output voltage of the wireless receiver circuit and target voltage. Of course, the instruction information may also indicate any combination of the foregoing contents, which is not specifically limited in the embodiments of the present disclosure.

Optionally, the instruction information may be carried in a control error packet (CEP).

In the embodiments of the disclosure, the target voltage may be directly configured at the transmitting device. In this case, the device to-be-charged may send only the output voltage of the wireless receiver circuit to the transmitting device, and the transmitting device may further adjust the transmit voltage thereof according to the difference between the output voltage of the wireless receiver circuit and the target voltage.

In another implementation, the device to-be-charged may forward the difference between the output voltage of the wireless receiver circuit and the target voltage to the transmitting device. When the output voltage of the wireless receiver circuit is less than the target voltage, the wireless receiver circuit needs to increase its output voltage so as to reach the target voltage. Since the output voltage of the wireless receiver circuit depends on the transmit voltage of the wireless transmitter circuit, the transmit voltage of the wireless transmitter circuit may be increased to make the output voltage of the wireless receiver circuit reach the target voltage. After receiving the instruction information, the transmitting device may increase the transmit voltage of the wireless transmitter circuit according to the difference between the output voltage of the wireless receiver circuit and the target voltage.

The device to-be-charged may sent, to the transmitting device, the difference between the output voltage of the wireless receiver circuit and the target voltage through the CEP. In other words, the device to-be-charged may send the CEP to the transmitting device, and the CEP may include the difference between the output voltage of the wireless receiver circuit and the target voltage.

In the embodiments of the present disclosure, the way of reducing the charging power currently required by the battery is not specifically limited.

For example, the charging power currently required by the battery may be directly reduced to a small value, so that the power of the wireless charging signal can meet the charging power currently required by the battery. Reducing the charging power currently required by the battery may be implemented by reducing the charging current currently required by the battery.

For another example, the charging power required by the battery may be reduced gradually by reducing the charging current currently required by the battery step-by-step. Specifically, by reducing the charging current currently required by the battery by a certain amount each time, the charging power required by the battery may be reduced.

The process of making the output power of the wireless receiver circuit reach the target voltage by reducing the charging current currently required by the battery will be described in detail below.

Figure 3:
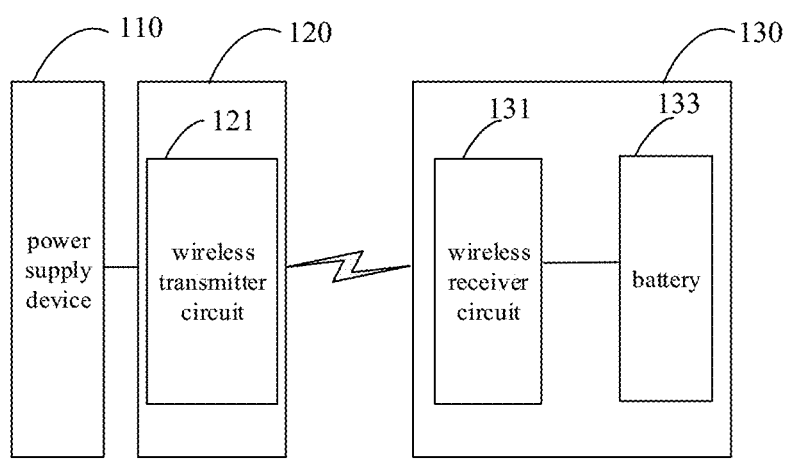
FIG. 3 is a schematic structural diagram of a wireless charging system provided by an embodiment of the present disclosure.

The solution provided by the embodiments of the present disclosure may be suitable for charging a battery in a boosting and current-increasing manner, which is described below with reference to FIG. 3.

Normally, the voltage of the battery remains unchanged within a period of time, and therefore, the charging voltage of the battery may also remain unchanged. When the charging current required by the battery increases, it also means that the charging power required by the battery increases. When the charging power required by the battery increases, the output power of the wireless receiver circuit is required to increase. Since the output current of the power supply device substantially remains unchanged, the output current of the wireless receiver circuit also remains unchanged substantially. Therefore, the output power may be increased by increasing the output voltage of the wireless receiver circuit. The output voltage of the wireless receiver circuit may be increased by increasing the output voltage of the power supply device. The power supply device may increase the output power by increasing the output voltage, so as to make the charging power required by the battery met (accordingly, the charging current required by the battery is increased, as mentioned above). This way of increasing the charging current of the battery by increasing the output voltage of the power supply device may be referred to as a boosting and current-increasing process.

It can be seen from the above that, under normal circumstances, the charging current of the battery may be increased by instructing the transmitter circuit to increase the transmit voltage. If the device to-be-charged is not misaligned, the transmit voltage of the wireless transmitter circuit can meet the maximum charging current required by the battery.

When the device to-be-charged is misaligned, the power received by the wireless receiver circuit is less than the power transmitted by the wireless transmitter circuit. After the transmit power of the wireless transmitter circuit reaches the upper limit, there may be a situation that the charging current provided by the wireless receiver circuit to the battery is still less than the charging current currently required by the battery.

For example, in a case where the transmit power of the transmitting device is 15 W, and the corresponding transmit voltage and transmit current are 15V and 1 A respectively, when the device to-be-charged is misaligned, the power received by the wireless receiver circuit is only 12 W, and the corresponding output voltage and output current are 12V and 1 A respectively. It is assumed that the charging voltage and charging current currently required by the battery are 15V and 1 A, and for charging the battery with the charging voltage of 15V and the charging current of 1 A, the desired output voltage of the wireless receiver circuit is 15V, and the 1 A charging current required by the battery corresponds to the 15V output voltage of the wireless receiver circuit. Since the charging power received by the wireless receiver circuit is less than the charging power currently required by the battery due to the misalignment, the device to-be-charged may charge the battery according to a charging voltage of 15V and a charging current of 0.8 A. Therefore, since the 12V output voltage of the wireless receiver circuit is less than the target voltage of 15V, i.e., the output voltage of the wireless receiver circuit does not reach the target voltage, the charging current of the battery is caused to be 0.8 A which is less than the 1 A charging current required by the battery.

However, if the charging system fails to determine that this situation is caused by the misalignment of the device to-be-charged, and still performs the charging according to the normal charging process, the device to-be-charged continuously sends the CEP to the transmitting device since the output voltage of the wireless receiver circuit is less than the target voltage, to instruct the transmitting device to increase the transmit voltage, which will cause the occupation of communication channel resources.

In the solution provided by the embodiments of the present disclosure, the target voltage may be reduced by reducing the charging current required by the battery, so as to reduce the difference between the output voltage of the wireless receiver circuit and the target voltage. In one implementation, the charging current required by the battery may be directly reduced to the minimum, so that the target voltage is made less than or equal to the output voltage of the wireless receiver circuit. In another implementation, the charging current required by the battery may be gradually reduced. For example, the charging current required by the battery may be reduced by 100 mA each time. Specifically, if it is determined that the difference between the output voltage of the wireless receiver circuit and the target voltage is not zero for many times in a row such as ten consecutive times, the charging current required by the battery may be reduced by 100 mA. Then, the output voltage of the wireless receiver circuit continues to be detected. If the difference between the output voltage of the wireless receiver circuit and the target voltage is zero, the battery may be charged with the current charging current. If it is determined many times that the difference between the output voltage of the wireless receiver circuit and the target voltage is still not zero after the charging current required by the battery is reduced, the charging current required by the battery may continue to be reduced by 100 mA, and the above process may be repeated until the difference between the output voltage of the wireless receiver circuit and the target voltage is zero. In this way, a critical point where the output voltage of the wireless receiver circuit is equal to the target voltage may be found in the process of gradually reducing the charging current required by the battery, so that the wireless receiver circuit may charge the battery with a charging current as large as possible.

In the case where the difference between the output voltage of the wireless receiver circuit and the target voltage is large, the charging current required by the battery may be adjusted within a wide range. In the case where the difference is small, the charging current required by the battery may be adjusted within a small range.

For example, the device to-be-charged may set multiple grades for the charging current required by the battery. In the case where it is determined that the difference between the output voltage of the wireless receiver circuit and the target voltage is large, the charging current required by the battery may be adjusted by at least two grades, and the current value corresponding to each grade may be a fixed value, such as 50 mA or 100 mA. In the case where the difference between the output voltage of the wireless receiver circuit and the target voltage is small, the charging current required by the battery may be adjusted by one grade.

For example, in the case where the output voltage of the wireless receiver circuit is less than the target voltage of 2V, the charging current required by the battery may be adjusted by two grades; and in the case where the output voltage of the wireless receiver circuit is less than the target voltage of 1V, the charging current required by the battery may be adjusted by one grade.

It is also illustrated by taking the case where the transmit power of the transmitting device is 15 W and the power received by the wireless receiver circuit is 12 W as an example. The output voltage of the wireless receiver circuit is 12V which is less than the target voltage of 15V, and the charging current currently required by the battery is 1 A. In the process of reducing the charging current required by the battery, for example, the charging current required by the battery is reduced from 1 A to 0.8 A. Correspondingly, the target voltage is reduced from 15V to 12V. Since the current output voltage of the wireless receiver circuit is 12V, the output voltage of the wireless receiver circuit is equal to the target voltage, and thus the device to-be-charged may no longer instruct the transmitting device to increase the output power, reducing the occupation of channel resources.

After the transmit power of the transmitting device reaches the upper limit, if the battery is always charged in this state, the transmitting device works at full capacity, which results in a large loss and serious heating. In the technical solution provided by the embodiments of the present disclosure, the charging current of the battery may be reduced in the process of reducing the charging current required by the battery; and since the charging voltage of the battery remains unchanged within a period of time, the charging power of the battery may be decreased. After the charging power of the device to-be-charged is decreased, the output power of the transmitting device may also be reduced accordingly, which can prevent the transmitting device from working at full capacity all the time and reduce the heat generated by the transmitting device.

In the process of charging the battery with the reduced charging current required by the battery, there may be a case where the device to-be-charged is aligned or the charging efficiency is improved. For example, the receiving coil of the device to-be-charged is aligned with the transmitting coil of the transmitting device, or the offset of the receiving coil of the device to-be-charged with respect to the transmitting coil of the transmitting device is improved to be within an acceptable range, within which range, the charging of the device to-be-charged by the transmitting device is not affected. For another example, although the receiving coil of the device to-be-charged is not aligned with the transmitting coil of the transmitting device, the receiving efficiency of the wireless receiver circuit is increased. In this case, if the battery continues to be charged with a small current, the charging speed may be caused to be too slow. Therefore, the embodiments of the present disclosure also provide a wireless charging control method, by which the battery can be charged with the maximum charging current after the device to-be-charged is aligned.

After the charging current required by the battery is reduced, the output voltage of the wireless receiver circuit continues to be detected to determine the difference between the output voltage of the wireless receiver circuit and the target voltage. In the case where it is detected for many times that the difference between the output voltage of the wireless receiver circuit and the target voltage is zero, for example, if it is detected that the difference between the output voltage of the wireless receiver circuit and the target voltage is zero for three consecutive times, the charging current required by the battery may be increased. For example, the charging current required by the battery may be increased to a target charging current. If the output voltage of the wireless receiver circuit can be equal to the target voltage after the charging current required by the battery is increased, the battery may be charged with the increased charging current, which can increase the charging speed.

Optionally, the target charging current may be the maximum charging current required by the battery.

In the embodiments of the present disclosure, the way of increasing the charging current required by the battery to the target charging current is not specifically limited. For example, the charging current required by the battery may be directly increased to the target charging current at one time. For another example, the charging current required by the battery may also be gradually increased to the target charging current in such a manner that the charging current required by the battery is increased by a certain amount such as 50 mA each time.

The way of increasing the charging current required by the battery will be described in detail below.

The charging current required by the battery may be directly increased to the maximum charging current at one time. For example, the wireless receiver circuit may detect the CEP, and in the case where it is detected from the CEP that the difference between the output voltage of the wireless receiver circuit and the target voltage is zero for many times, the charging current required by the battery may be directly increased to the maximum charging current. If the difference between the output voltage of the wireless receiver circuit and the target voltage is still zero after the charging current required by the battery is increased, the battery may be charged with the increased charging current. If the difference between the output voltage of the wireless receiver circuit and the target voltage is not zero after the charging current required by the battery is increased, the charging current currently required by the battery may be maintained at the current charging current (i.e., the charging current adopted before the charging current required by the battery is increased).

The charging current required by the battery may also be gradually increased in such a manner that the charging current required by the battery is increased step-by-step. For example, the wireless receiver circuit may detect the CEP, and in the case where it is detected from the CEP that the difference between the output voltage of the wireless receiver circuit and the target voltage is zero for many times, the charging current required by the battery may be gradually increased in such a manner that the charging current required by the battery is increased by a small amount each time. For example, the charging current required by the battery may be increased by 50 mA every 20 seconds. Specifically, if it is detected from multiple consecutive CEPs that the difference between the output voltage of the wireless receiver circuit and the target voltage is zero, the charging current required by the battery may be increased by 50 mA, and then the output voltage of the wireless receiver circuit may continue to be detected. If the difference between the output voltage of the wireless receiver circuit and the target voltage is not zero after the charging current required by the battery is increased, the charging current required by the battery is reduced to the charging current before the increase thereof. If it is detected from the CEP that the difference between the output voltage of the wireless receiver circuit and the target voltage is still zero after 20 seconds elapse, the charging current required by the battery may continue to be increased by 50 mA, and the above process may be repeated until the charging current required by the battery reaches the maximum charging current. In this way, not only can the battery be charged with the maximum charging current after the device to-be-charged is taken out of the misalignment state so as to be aligned, but the battery can be charged with a charging current as large as possible even if the device to-be-charged is not aligned but the offset distance is adjusted (i.e., shorted).

Figure 4:
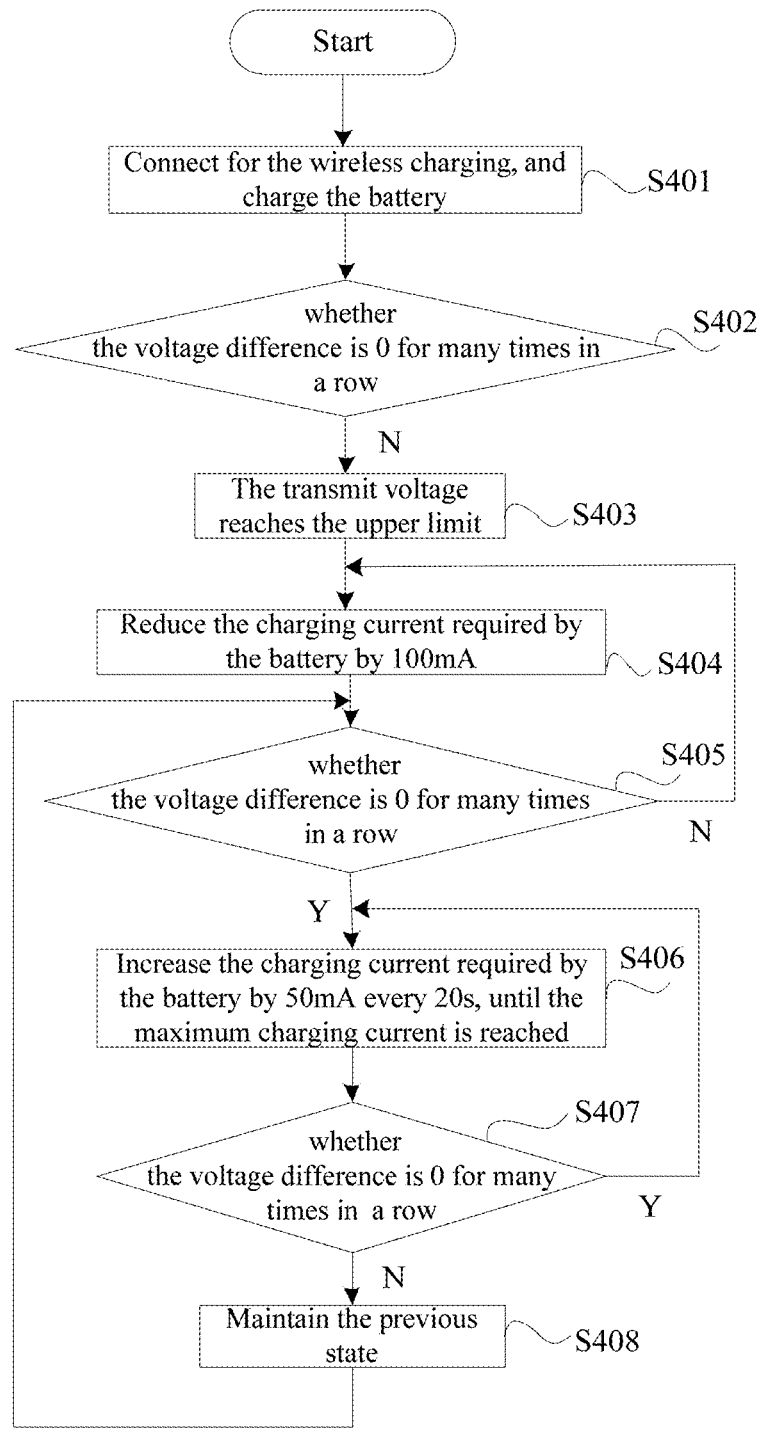
FIG. 4 is a schematic flowchart of a wireless charging control method provided by another embodiment of the present disclosure.

The wireless charging control method provided by the embodiments of the present disclosure will be described in detail below with reference to FIG. 4.

In S401, after the device to-be-charged is connected to the transmitting device, the transmitting device starts to charge the device to-be-charged. The transmitting device may charge the device to-be-charged in the boosting and current-increasing manner until the charging current of the battery reaches the maximum. The charging current of the battery reaching the maximum may mean that the charging current of the battery remains unchanged for a long period of time, without increasing. The specific process of the boosting and current-increasing may be referred to the description mentioned above.

In S402, the difference between the output voltage of the wireless receiver circuit and the target voltage is detected from the CEPs, and it is determined whether the difference is zero for many times in a row.

In S403, if it is determined that the difference is not zero for many times in a row such as two or more consecutive times, this shows that the output voltage of the power supply device has reached the upper limit, that is, the output voltage of the wireless receiver circuit has reached the maximum and cannot be increased anymore. This situation also shows that the device to-be-charged is misaligned, causing the output voltage of the wireless receiver circuit to fail to meet the charging requirement of the battery.

In S404, the charging current currently required by the battery is reduced. For example, the charging current required by the battery may be reduced by 100 mA.

In S405, after the charging current required by the battery is reduced, it continues to detect, from the CEPs, the difference between the output voltage of the wireless receiver circuit and the target voltage, and it is determined whether the difference is zero. If it is determined that the difference is not zero for many times in a row such as two or more consecutive time, this shows that the output voltage of the wireless receiver circuit still fails to meet the charging requirement of the battery. At this time, the charging current required by the battery may continue to be reduced by 100 mA until the voltage difference is zero.

In S406, if it is detected from the CEPs that the difference between the output voltage of the wireless receiver circuit and the target voltage is zero for many times in a row, this shows that the output voltage of the wireless receiver circuit can meet the current charging requirement of the battery. At this time, an attempt is made to increase the charging current required by the battery, so as to charge the battery with a charging current as large as possible to increase the charging speed. For example, the charging current required by the battery may be increased by 50 mA every 20 seconds.

In S407, if the difference between the output voltage of the wireless receiver circuit and the target voltage is still zero after the charging current required by the battery is increased, this shows that the device to-be-charged has been aligned. At this time, the charging current required by the battery may continue to be increased until it reaches the maximum charging current required by the battery.

In S408, if the difference between the output voltage of the wireless receiver circuit and the target voltage is not zero after the charging current required by the battery is increased, this shows that the output voltage of the wireless receiver circuit fails to meet the charging requirement of the battery after the charging current required by the battery is increased, and shows that the device to-be-charged has not been aligned. At this time, it may return to the previous charging state, and then the charging current currently required by the battery is maintained at the current charging current (i.e., the charging current used before the last increase).

The wireless charging control methods provided by the embodiments of the present disclosure are described in detail in the above, and the charging control device of the embodiments of the present disclosure will be described below with reference to FIGS. 5 to 8. It should be understood that the features of the method embodiments are also applicable to the device embodiments. The device embodiments and the method embodiments correspond to each other, and thus the parts that are not described in detail may be referred to the previous method embodiments.

Figure 5:
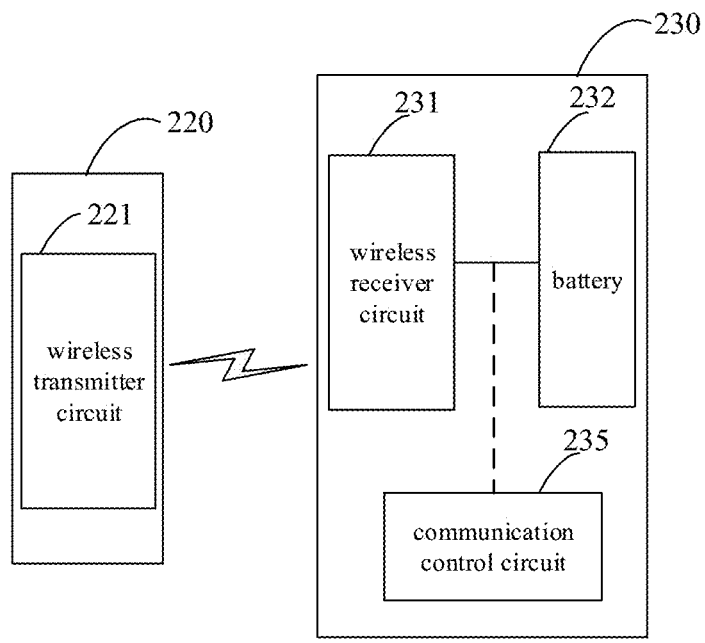
FIG. 5 is a schematic structural diagram of a charging control device provided by an embodiment of the present disclosure.

The charging system shown in FIG. 5 may include a transmitting device 220 and a charging control device 230. The charging control device may refer to the device to-be-charged as described above, and the charging control device may also be referred to as a wireless charging signal receiving device.

The transmitting device 220 may include a wireless transmitter circuit 221. The wireless transmitter circuit 221 may be configured to transmit a wireless charging signal to charge the battery 232 of the charging control device 230. In some implementations, the wireless transmitter circuit 221 may include a wireless transmission drive circuit and a transmitting coil (or a transmitting antenna). The wireless transmission drive circuit may be configured to generate a high-frequency alternating current power, and the transmitting coil or transmitting antenna may be configured to convert the high-frequency alternating current power into an electromagnetic signal for transmission.

The charging control device 230 may include a wireless receiver circuit 231 and a communication control circuit 235.

The wireless receiver circuit 231 may be configured to receive the wireless charging signal transmitted by the wireless transmitter circuit 221, and convert the wireless charging signal into the output voltage and output current of the wireless receiver circuit.

The communication control circuit 235 may have a communication function, and may be configured to communicate with the transmitting device 220 during the wireless charging process. More specifically, the communication control circuit 235 may be configured to communicate with the transmitting device 220 based on the output voltage of the wireless receiver circuit.

The communication control circuit 235 may be configured to perform the following operations: determining, according to the output voltage of the wireless receiver circuit 231, whether the power of the wireless charging signal can meet the charging power currently required by the battery; and reducing the charging power currently required by the battery 232 in response to determining that the power of the wireless charging signal fails to meet the charging power currently required by the battery 232. Optionally, the control function of the communication control circuit 235 may be implemented by, for example, a Micro Control Unit (MCU).

Optionally, the communication control circuit 235 may be configured to: determine, according to the output voltage of the wireless receiver circuit 231, whether the output voltage of the wireless receiver circuit 231 can reach a target voltage; and determine the power of the wireless charging signal received by the wireless receiver circuit 231 fails to meet the charging power currently required by the battery, in response to determining that the output voltage of the wireless receiver circuit 231 fails to reach the target voltage.

The target voltage may be an output voltage of the wireless receiver circuit that matches the charging power currently required by the battery.

The charging control device 230 may further include a detection circuit configured to detect the output voltage of the wireless receiver circuit 231. The communication control circuit 235 may compare the detected output voltage with the target voltage. When the output voltage of the wireless receiver circuit 231 is less than the target voltage, instruction information is sent to the transmitting device 220 to instruct the transmitting device 220 to increase the transmit voltage of the wireless transmitter circuit 221, so as to reduce the difference between the output voltage of the wireless receiver circuit 231 and the target voltage. If the output voltage of the wireless receiver circuit still fails to reach the target voltage after the communication control circuit 235 instructs, for many times such as at least twice, the transmitting device 220 to increase the transmit voltage, the communication control circuit 235 may determine that the charging power of the wireless charging signal fails to meet the charging power currently required by the battery. At this time, the communication control circuit 235 may determine that the device to-be-charged is misaligned.

Optionally, the communication control circuit 235 may also be configured to reduce the charging power required by the battery when the power of the wireless charging signal fails to meet the charging power required by the battery for a preset period of time.

With regard to the contents of the instruction information, the embodiments of the disclosure do not make specific limitation thereto. The instruction information may include the output voltage of the wireless receiver circuit, or the instruction information may include the difference between the target voltage and the output voltage of the wireless receiver circuit, or the instruction information may include the output voltage of the wireless receiver circuit and target voltage. Of course, the instruction information may also include any combination of the foregoing contents.

Optionally, the instruction information may be carried in the CEP.

Optionally, the charging power currently required by the battery 232 may be reduced by reducing the charging current required by the battery 232. During the process of charging the battery, since the voltage of the battery substantially remains unchanged for a period of time, the charging voltage required by the battery substantially remains unchanged. Therefore, the charging power required by the battery may be reduced by reducing the charging current required by the battery.

There are many ways to reduce the charging current required by the battery. For example, the charging current required by the battery may be directly reduced to the minimum charging current. Since there is a corresponding relationship between the charging current required by the battery and the target voltage, after the charging current required by that battery is reduced, the target voltage is reduced accordingly. Therefore, after the charging current of the battery is reduced to the minimum charging current, the output voltage of the wireless receiver circuit is enabled to reach the target voltage, that is, the power of the wireless charging signal can meet the charging current currently required by the battery. For another example, the charging current currently required by the battery may be gradually reduced. For example, the charging current currently required by the battery may be gradually reduced in such a manner that the charging current required by the battery is decreased by a certain amount each time, until the power of the wireless charging signal can meet the charging current currently required by the battery.

Optionally, the communication control circuit 235 may reduce the charging current required by the battery 232 according to the difference between the output voltage of the wireless receiver circuit 231 and the target voltage. When the communication control circuit 235 determines that the difference between the output voltage of the wireless receiver circuit 231 and the target voltage is large, the charging current required by the battery 232 may be adjusted within a wide range. When the communication control circuit 235 determines that the difference between the output voltage of the wireless receiver circuit 231 and the target voltage is small, the charging current required by the battery 232 may be adjusted within a small range.

For example, the charging control device 230 may set multiple grades for the charging current required by the battery 232. In the case where the communication control circuit 235 determines that the difference between the output voltage of the wireless receiver circuit 231 and the target voltage is large, the charging current required by the battery 232 may be reduced by multiple grades, and the current value corresponding to each grade may be a fixed value, such as 50 mA or 100 mA. In the case where the communication control circuit 235 determines that the difference between the output voltage of the wireless receiver circuit 231 and the target voltage is small, the charging current required by the battery 232 may be reduced by one grade.

After the charging current required by the battery 232 is reduced, there may be case where the charging control device 230 is aligned. At this time, if the charging is performed with the relatively small charging current, the charging speed is too slow. Therefore, after the charging power required by the battery is reduced, an attempt may be made to increase the charging current required by the battery. If the output voltage of the wireless receiver circuit 231 can reach the target voltage after the charging current required by the battery is increased, the battery 232 may be charged with the increased charging current.

With regard to the way of increasing the charging current required by the battery, the embodiments of the present disclosure do not make specific limitation thereto. For example, the charging current required by the battery may be directly increased to the target charging current. For another example, the charging current required by the battery may also be increased to the target charging current step-by-step, for example, the charging current required by the battery may be gradually increased to the target charging current in such a manner that the charging current required by the battery is increased by a certain amount each time.

Optionally, the target charging current may be the maximum charging current required by the battery.

For example, after the charging power currently required by the battery 232 is reduced, the output voltage of the wireless receiver circuit 231 may continue to be detected. When it is detected that the output voltage of the wireless receiver circuit 231 can reach the target voltage for a long period of time, the charging current required by the battery may be increased. After the charging current required by the battery 232 is increased, the output voltage of the wireless receiver circuit 231 is detected. And if the output voltage of the wireless receiver circuit 231 can reach the target voltage, the battery 232 may be charged with the increased charging current; and if the output voltage of the wireless receiver circuit 231 fails to reach the target voltage, the battery 232 is charged with the previous charging current.

Similar to the way of reducing the charging current required by the battery, the charging current required by the battery may be directly increased to the maximum charging current, or it can be increased gradually, the embodiments of the disclosure do not make specific limitation thereto. In addition, the way of increasing or decreasing the charging current required by the battery may be referred to the above method embodiments, which will not be repeated here.

With regard to the communication between the communication control circuit 235 and the transmitting device 220, the embodiments of the present disclosure do not make specific limitation thereto. Optionally, in some implementations, the communication control circuit 235 and the transmitting device 220 may communicate with each other through Bluetooth communication, wireless fidelity (Wi-Fi) communication or backscatter modulation (or power load modulation) communication, short-range wireless communication based on high carrier frequency, optical communication, ultrasonic communication, ultra-wideband communication, mobile communication or other wireless communication methods.

In an implementation, a short-range wireless communication module based on high carrier frequency may include an integrated circuit (IC) chip with an extremely high frequency (EHF) antenna encapsulated therein. Optionally, the high carrier frequency may be 60 GHz.

In an implementation, the optical communication may mean that an optical communication module is utilized for communication. The optical communication module may include an infrared communication module which may utilize infrared to transmit information.

In an implementation, the mobile communication may mean that a mobile communication module is utilized for communication. The mobile communication module may use mobile communication protocols such as 5G communication protocol, 4G communication protocol or 3G communication protocol, for information transmission.

By adopting the above-mentioned wireless communication, compared with the way of coupling, through signal modulation, a signal to the coil of the wireless receiver circuit for communication in the Qi standard, the reliability of the communication can be improved, and the voltage ripple caused by signal coupling can be avoided which would otherwise affect the voltage processing of the buck circuit.

Optionally, wired communication may also be performed between the communication control circuit 235 and the transmitting device 220 through a data interface.

Figure 6:
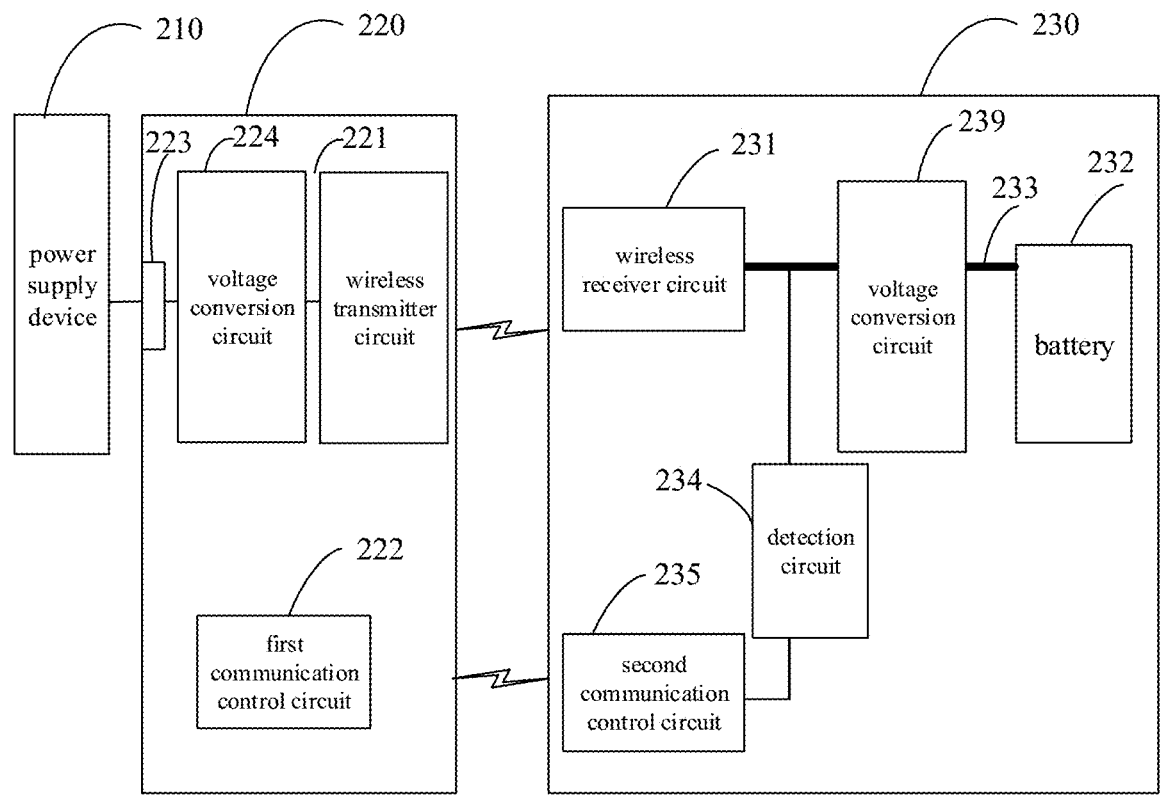
FIG. 6 is a schematic structural diagram of a wireless charging system provided by another embodiment of the present disclosure.

FIG. 6 is another schematic diagram of a charging system provided by the embodiments of the present disclosure. Referring to FIG. 6, the wireless charging signal transmitting device 220 may further include a charging interface 223 and a first communication control circuit 222, and the charging interface 223 may be configured to connect to an external power supply device 210. The wireless transmitter circuit 221 may also be configured to generate a wireless charging signal according to the output voltage and output current of the power supply device 210.

The first communication control circuit 222 may be configured to adjust the amount of power that the wireless transmitter circuit 221 draws from the output power of the power supply device 210 during the wireless charging process, to adjust the transmit power of the wireless transmitter circuit 221, so that the power transmitted by the wireless transmitter circuit can meet the charging requirement of the battery. For example, the power supply device 210 may directly output a fixed power which is relatively large (such as 40 W), and the first communication control circuit 222 may directly adjust the amount of power drawn by the wireless transmitter circuit 221 from the fixed power provided by the power supply device 210.

In the embodiments of the present disclosure, the output power of the power supply device 210 may be fixed. For example, the power supply device 210 may directly output a fixed power which is relatively large (for example, 40 W), and the power supply device 210 may provide, to the wireless charging device 220, the output voltage and output current according to the fixed output power. During the charging process, the first communication control circuit 222 may control a certain amount of power to be drawn from the fixed power of the power supply device as required, for performing the wireless charging. That is to say, in the embodiments of the present disclosure, the control over the adjustment of the transmit power of the wireless transmitter circuit 221 is assigned to the first communication control circuit 222, and the first communication control circuit 222 can adjust the transmit power of the wireless transmitter circuit 221 upon receiving the instruction information sent from the second communication control circuit 235, so as to meet the current charging requirement of the battery. In this way, a fast adjustment speed and a high efficiency are provided.

With regard to the way that the first communication control circuit 222 controls the amount of power to be drawn from the maximum output power provided by the power supply device 210, the embodiments of the present disclosure do not make specific limitation thereto. For example, a voltage conversion circuit 224 may be provided inside the wireless charging signal transmitting device 220, and the voltage conversion circuit 224 may be connected to the transmitting coil or the transmitting antenna for adjusting the power received by the transmitting coil or the transmitting antenna. The voltage conversion circuit 224 may include, for example, a pulse width modulation (PWM) controller and a switch unit. The first communication control circuit 222 may adjust the transmit power of the wireless transmitter circuit 221 by adjusting the duty cycle of a control signal sent by the PWM controller.

With regard to the type of the power supply device 210, the embodiments of the present disclosure do not make specific limitation thereto. For example, the power supply device 210 may be a device such as an adapter, a power bank, a car charger, or a computer.

With regard to the type of the charging interface 223, the embodiments of the present disclosure do not make specific limitation thereto. Optionally, in some implementations, the charging interface 223 may be a USB interface. The USB interface may be, for example, a USB 2.0 interface, a micro USB interface, or a USB TYPE-C interface. Optionally, in other implementations, the charging interface 223 may also be a lightning interface, or a parallel port and/or serial port of any other type that can be used for charging.

With regard to the communication between the first communication control circuit 222 and the power supply device 210, the embodiments of the present disclosure do not make specific limitation thereto. As an example, the first communication control circuit 222 may be connected to the power supply device 210 through a communication interface other than the charging interface, and communicate with the power supply device 210 through the communication interface. As another example, the first communication control circuit 222 may communicate with the power supply device 210 wirelessly. For example, the first communication control circuit 222 may perform near field communication (NFC) with the power supply device 210. As another example, the first communication control circuit 222 may communicate with the power supply device 210 through the charging interface 223 without additionally providing a communication interface or other wireless communication module, which can simplify the implementation of the wireless charging device 220. For example, the charging interface 223 is a USB interface, and the first communication control circuit 222 may communicate with the power supply device 210 based on a data line (such as a D+ and/or D− line) in the USB interface. For another example, the charging interface 223 may be a USB interface supporting the power delivery (PD) communication protocol (such as a USB TYPE-C interface), and the first communication control circuit 222 and the power supply device 210 may communicate with each other based on the PD communication protocol.

Optionally, adjusting the transmit power of the wireless charging signal by the first communication control circuit 222 may refer to that the first communication control circuit 222 adjusts the transmit power of the wireless charging signal by adjusting the input voltage and/or input current of the wireless transmitter circuit 221. For example, the first communication control circuit may increase the transmit power of the wireless transmitter circuit by increasing the input voltage of the wireless transmitter circuit.

Optionally, as shown in FIG. 6, the wireless charging signal receiving device 230 further includes a first charging channel 233 through which the output voltage and/or output current of the wireless receiver circuit 231 may be provided to the battery 232, to charge the battery 232.

Optionally, a voltage conversion circuit 239 may be further provided on the first charging channel 233. An input end of the voltage conversion circuit 239 is electrically connected to the output end of the wireless receiver circuit 231. The voltage conversion circuit is configured to perform constant voltage control and/or constant current control on the output voltage of the wireless receiver circuit 231 for charging the battery 232, so that the output voltage and/or output current of the voltage conversion circuit 239 matches the charging voltage and/or charging current currently required by the battery.

Optionally, increasing the transmit power of the wireless transmitter circuit 221 may refer to increasing the transmit voltage of the wireless transmitter circuit 221. The transmit voltage of the wireless transmitter circuit 221 may be increased by increasing the output voltage of the voltage conversion circuit 224. For example, after receiving the instruction information to increase the transmit power that is sent from the second communication control circuit 235, the first communication control circuit 222 may increase the transmit power of the wireless transmitter circuit 221 by increasing the output voltage of the voltage conversion circuit 224.

With regard to the way that the second communication control circuit 235 sends the instruction information to the first communication control circuit 222, the embodiment of the present disclosure do not make specific limitation thereto.

For example, the second communication control circuit 235 may periodically send the instruction information to the first communication control circuit 222. Alternatively, the second communication control circuit 235 may send the instruction information to the first communication control circuit 222 only when the output voltage of the wireless receiver circuit is less than the target voltage. If the output voltage of the wireless receiver circuit 231 is equal to the target voltage, the second communication control circuit 235 may not send the instruction information to the first communication control circuit 222.

Optionally, the wireless charging signal receiving device may further include a detection circuit 234, which may be configured to detect the output voltage of the wireless receiver circuit 231. The second communication control circuit 235 may send, according to the output voltage of the wireless receiver circuit 231, instruction information to the first communication control circuit 222, to instruct the first communication control circuit 222 to adjust the transmit power of the wireless transmitter circuit 221. The instruction information may include at least one of the following information: the output voltage of the wireless receiver circuit, the target voltage, and the difference between the output voltage of the wireless receiver circuit and the target voltage.

In an implementation, for the device to-be-charged, during the trickle charging phase, the voltage of the battery continuously increases, and the charging power required by the battery increases accordingly. At this time, the transmit power of the wireless charging signal needs to be increased to meet the current charging requirement of the battery. In the segmented constant current charging phase, the charging current of the battery may continuously decrease, and the charging power required by the battery decreases accordingly. At this time, the transmit power of the wireless charging signal needs to be reduced to meet the current charging requirement of the battery.

With regard to the adjustment of the transmit power of the wireless charging signal by the first communication control circuit 222 according to the instruction information, it may mean that the first communication control circuit 222 may adjust the transmit power of the wireless charging signal so that the transmit power of the wireless charging signal matches the charging voltage and/or the charging current currently required by the battery.

The transmit power of the wireless transmitter circuit 221 matching the charging voltage and/or charging current currently required by the battery 232 may means that the first communication control circuit 222 configures the transmit power of the wireless charging signal such that the output voltage and/or output current of the first charging channel 233 matches the charging voltage and/or charging current currently required by the battery 232 (or, the first communication control circuit 222 configures the transmit power of the wireless charging signal such that the output voltage and/or output current of the first charging channel 233 meets the charging requirement of the battery 232 (including the requirements of the battery 232 for the charging voltage and/or charging current)).

It should be understood that, in an embodiment of the present disclosure, "the output voltage and/or output current of the first charging channel 233 matching the charging voltage and/or charging current currently required by the battery 232" includes that: the voltage value and/or current value of the direct current output by the first charging channel 233 is equal to the value of the charging voltage and/or charging current required by the battery 232, or it fluctuates within a preset range with respect to the value of the charging voltage value and/or charging current value required by the battery (for example, the voltage value fluctuates by 100 millivolts to 200 millivolts, and the current value fluctuates by 0.001 A to 0.005 A).

The process of charging the battery may include at least one of a trickle charging phase, a constant current charging phase, and a constant voltage charging phase.

With regard to the second communication control circuit 235 performing wireless communication with the first communication control circuit 222 according to the output voltage of the wireless receiver circuit that is detected by the detection circuit 234 so that the first communication control circuit 222 adjusts the transmit power of the wireless transmitter circuit according to the output voltage of the wireless receiver circuit, it may include that: during the trickle charging phase of the battery 232, the second communication control circuit 235 performs wireless communication with the first communication control circuit 222 according to the detected output voltage of the wireless receiver circuit, so that the first communication control circuit 222 adjusts the transmit power of the wireless transmitter circuit 221 to make the output current of the first charging channel 233 match the charging current corresponding to the trickle charging phase (or, make the output current of the first charging channel 233 meet the charging current required by the battery 232 at trickle charging phase).

Optionally, the instruction information may include the difference between the output voltage of the wireless receiver circuit and the target voltage. The second communication control circuit 222 may determine the current charging phase of the battery 232 according to the current power and/or current voltage of the battery 232, and then determine the output voltage of the wireless receiver circuit matching the charging voltage and/or charging current currently required by the battery 232. Then, the second communication control circuit 222 may compare the current output voltage of the wireless receiver circuit with the target voltage to determine whether the output voltage of the wireless receiver circuit matches the charging current currently required by the battery. And when the output voltage of the wireless receiver circuit does not match the charging current required by the battery, the second communication control circuit may send the instruction information to the first communication control circuit to instruct the first communication control circuit to adjust the transmit power of the wireless transmitter circuit, so that the output voltage of the wireless receiver circuit can be made match the charging current currently required by the battery.

Figure 7:
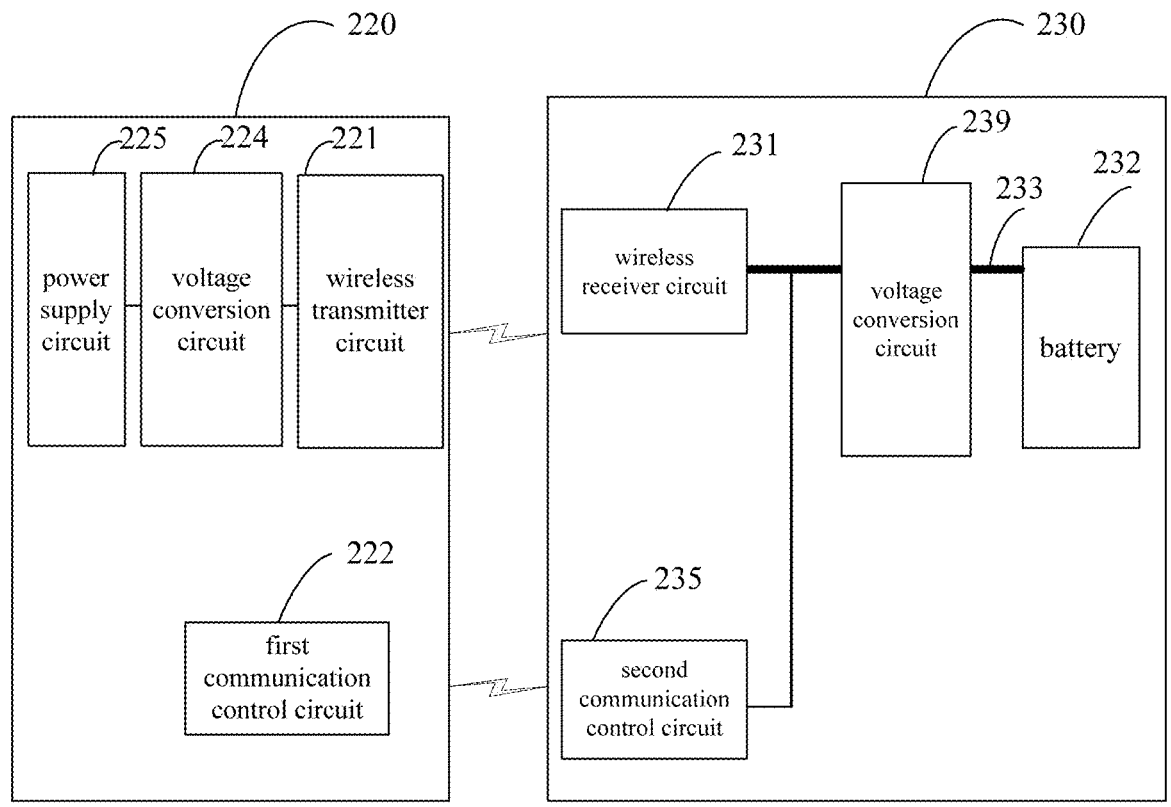
FIG. 7 is a schematic structural diagram of a wireless charging system provided by a further embodiment of the present disclosure.

FIG. 7 illustrates another example of the charging system provided by the embodiments of the present disclosure. The wireless charging signal transmitting device 220 corresponding to the embodiment of FIG. 7 does not obtain electric energy from the power supply device 210, but directly converts an externally input alternating current power (such as commercial power) into the above-mentioned wireless charging signal.

As shown in FIG. 7, the wireless charging signal transmitting device 220 may further include a voltage conversion circuit 224 and a power supply circuit 225. The power supply circuit 225 may be configured to receive the external alternating current power (such as commercial power), and generate the output voltage and output current of the power supply circuit 225 according to the alternating current power. For example, the power supply circuit 225 may perform rectification and/or filtering on the alternating current power to obtain a direct current power or pulsating direct current power, and transmit it to the voltage conversion circuit 224.

The voltage conversion circuit 224 may be configured to receive the output voltage of the power supply circuit 225 and convert the output voltage of the power supply circuit 225 to obtain the output voltage and output current of the voltage conversion circuit 224. The wireless transmitter circuit 221 may also be configured to generate the wireless charging signal according to the output voltage and output current of the voltage conversion circuit 224.

In the embodiment of the present disclosure, a function similar to that of an adapter is incorporated in the wireless charging signal transmitting device 220, so that the wireless charging signal transmitting device 220 does not need to obtain power from an external power supply device, which improves the integration of the wireless charging signal transmitting device 220, and also reduces the number of devices required for the wireless charging process.

Optionally, in the embodiments of the present disclosure, different ranges of the output voltage of the wireless receiver circuit may be set for different charging phases. For example, for the trickle charging phase, the charging current required by the device to-be-charged is small, and a small target voltage may be set; and for the constant current charging phase, the charging current required by the device to-be-charged is large, and a large target voltage may be set.

Optionally, in some embodiments, the wireless charging signal transmitting device 220 may support a first wireless charging mode and a second wireless charging mode. The changing speed at which the wireless charging signal transmitting device 220 charges the device to-be-charged in the first wireless charging mode is faster than the charging speed at which the wireless charging signal transmitting device 220 charges the device to-be-charged in the second wireless charging mode. In other words, compared with the wireless charging signal transmitting device 220 working in the second wireless charging mode, the wireless charging signal transmitting device 220 working in the first wireless charging mode takes a shorter time to make the battery of the device to-be-charged with the same capacity fully charged.

The second wireless charging mode may be referred to as a normal wireless charging mode, for example, it may be a conventional wireless charging mode based on the QI standard, the PMA standard, or the A4WP standard. The first wireless charging mode may be a fast wireless charging mode. The normal wireless charging mode may be a wireless charging mode in which the transmit power of the wireless charging signal transmitting device 220 is relatively small (usually less than 15 W, and the commonly used transmit power is 5 W or 10 W). In the normal wireless charging mode, it usually takes several hours to make a large-capacity battery (such as a battery of 3000 mAh) fully charged. In the fast wireless charging mode, the transmit power of the wireless charging signal transmitting device 220 is relatively large (usually greater than or equal to 15 W). Compared with the normal wireless charging mode, the wireless charging signal transmitting device 220 working in the fast wireless charging mode takes a much shorter time to make a battery with the same capacity fully charged, and the charging speed thereof is faster.

Figure 8:
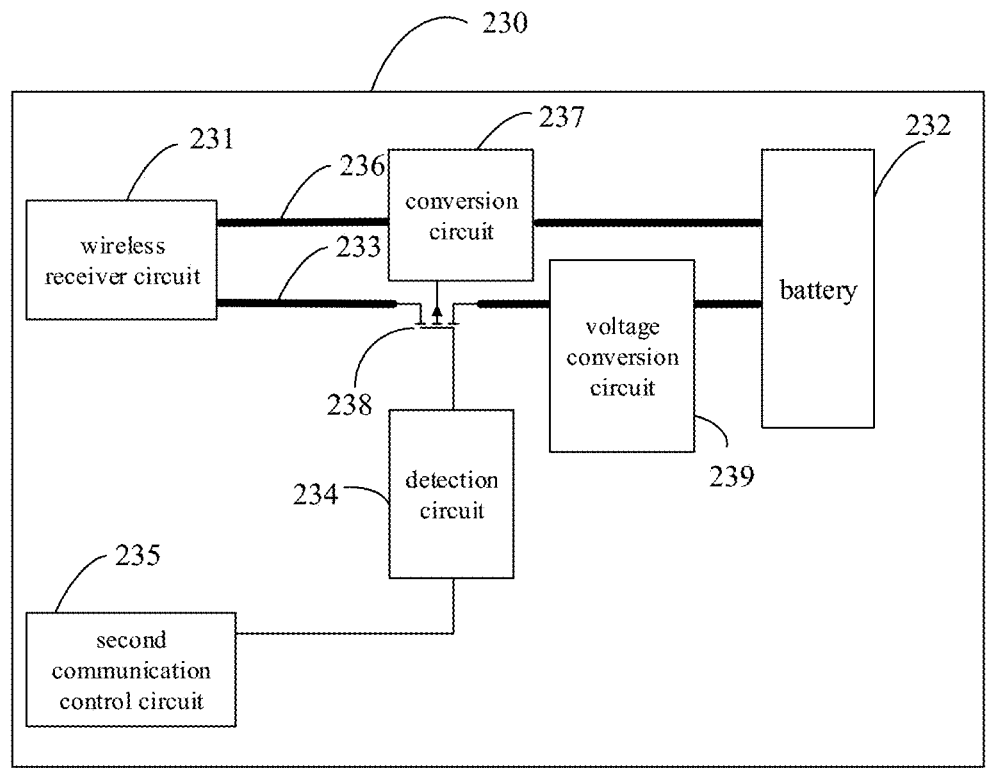
FIG. 8 is a schematic structural diagram of a wireless charging system provided by yet another embodiment of the present disclosure.

Referring to FIG. 8, in an embodiment of the present disclosure, the wireless charging signal receiving device 230 further includes a second charging channel 236. The second charging channel 236 may be a wire. A conversion circuit 237 may be provided on the second charging channel 236 to perform voltage control on the direct current power output by the wireless receiver circuit 231, to obtain the output voltage and output current of the second charging channel 236, for charging the battery 232.

In an implementation, the conversion circuit 237 may be configured as a buck circuit, and output a constant current and/or constant voltage electric energy. In other words, the conversion circuit 237 may be configured to perform constant voltage and/or constant current control for the process of charging the battery.

When the second charging channel 236 is adopted to charge the battery 232, the wireless transmitter circuit 221 may use a constant transmit power to transmit an electromagnetic signal. After the electromagnetic signal is received by the wireless receiver circuit 231, it is processed by the conversion circuit 237 into a voltage and current meeting the charging requirement of the battery 232, and is input to the battery 232 for charging the battery 232. It should be understood that, in some embodiments, the constant transmit power does not necessarily mean that the transmit power remains completely unchanged, and it may vary within a certain range. For example, the transmit power is 7.5 W and it may fluctuate by 0.5 W.

In this embodiment, the second communication control circuit 235 is also configured to compare the detected output voltage of a rectifier circuit in the wireless receiver circuit with the target voltage to determine an error value, and then send the error value in the form of a packet to the wireless charging signal transmitting device 220.

In an implementation, when the battery 232 is charged through the second charging channel 236, the wireless charging signal transmitting device and the device to-be-charged may perform the wireless charging according to the Qi standard. In this case, a data signal containing the above error value may be coupled, through signal modulation, to the coil of the wireless receiver circuit 231 so as to be sent to the coil of the wireless transmitter circuit 221, and then transmitted to the first communication control circuit 222. The first communication control circuit 222 adjusts, according to the information of the error data packet, the transmission parameters of the wireless transmitter circuit 221, for example, the transmit voltage of the wireless transmitter circuit.

In the embodiments of the present disclosure, the charging mode in which the battery 232 is charged through the first charging channel 233 is the first wireless charging mode, and the charging mode in which the battery 232 is charged through the second charging channel 236 is the second wireless charging mode. The wireless charging signal transmitting device and the device to-be-charged may determine, through handshake communication, whether to use the first wireless charging mode or the second wireless charging mode to charge the battery 232.

In the embodiments of the present disclosure, on the side of the wireless charging device, when the device to-be-charged is charged in the first wireless charging mode, the maximum transmit power of the wireless transmitter circuit 221 may be a first transmit power. When the device to-be-charged is charged in the second wireless charging mode, the maximum transmit power of the wireless transmitter circuit 221 may be a second transmit power. The first transmit power is greater than the second transmit power, and accordingly, the charging speed of charging the device to-be-charged in the first wireless charging mode is greater than that of the second wireless charging mode.

Optionally, the second communication control circuit 235 may also be configured to control the switching between the first charging channel 233 and the second charging channel 236. For example, as shown in FIG. 8, a switch 238 may be provided on the first charging channel 233, and the second communication control circuit 235 may control the switching between the first charging channel 233 and the second charging channel 236 by controlling the switch 238 to be switched on or off. As stated above, in some embodiments, the wireless charging signal transmitting device 220 may support the first wireless charging mode and the second wireless charging mode, and the charging speed at which the wireless charging signal transmitting device 220 charges the device to-be-charged 230 in the first wireless charging mode is faster than the charging speed at which the wireless charging signal transmitting device 220 charges the device to-be-charged 230 in the second wireless charging mode. When the wireless charging signal transmitting device 220 adopts the first wireless charging mode to charge the battery in the device to-be-charged 230, the device to-be-charged 230 may control the first charging channel 233 to work. When the wireless charging signal transmitting device 220 adopts the second wireless charging mode to charge the battery in the device to-be-charged 230, the device to-be-charged 230 may control the second charging channel 236 to work.

On the side of the device to-be-charged, the second communication control circuit 235 may control, according to the charging mode, the switching between the first charging channel 233 and the second charging channel 236. When the first wireless charging mode is adopted, the second communication control circuit 235 controls the voltage conversion circuit 239 on the first charging channel 233 to work. When the second wireless charging mode is adopted, the second communication control circuit 235 controls the conversion circuit 237 on the second charging channel 236 to work.

Optionally, the wireless charging signal transmitting device 220 may communicate with the wireless charging signal receiving device 230 to negotiate the charging mode between the wireless charging signal transmitting device 220 and the wireless charging signal receiving device 230.

In addition to the communication contents described above, the first communication control circuit 222 in the wireless charging signal transmitting device 220 and the second communication control circuit 235 in the wireless charging signal receiving device 230 may also exchange many pieces of other communication information. In some implementations, the first communication control circuit 222 and the second communication control circuit 235 may exchange, for example, information for safety protection, anomaly detection or fault handling, such as the temperature information of the battery 232; indication information indicating the entry of the overvoltage protection or overcurrent protection; and information on power transmission efficiency (the information on power transmission efficiency may be configured to indicate the efficiency of the power transmission between the wireless transmitter circuit 221 and the wireless receiver circuit 231).

Optionally, the communication between the second communication control circuit 235 and the first communication control circuit 222 may be one-way communication or two-way communication, which is not specifically limited in the embodiments of the present disclosure.

In the embodiments of the present disclosure, the function of the second communication control circuit may be provided by an application processor of the wireless charging signal receiving device 230. In this way, the hardware cost can be reduced. Alternatively, the function of the second communication control circuit may also be provided by an independent control chip, which can improve the reliability of the control.

Optionally, in the embodiments of the present disclosure, the wireless receiver circuit 231 and the voltage conversion circuit 239 may be integrated in a same wireless charging chip, which can improve the integration of the device to-be-charged and simplify the implementation of the device to-be-charged. For example, the functions of conventional wireless charging chips may be expanded to support charging management functions.

The battery 232 in the wireless charging system provided by the embodiments of the present disclosure may include a single cell, or may include N cells connected in series (N is a positive integer greater than 1). Taking N=2 as an example, the battery 232 may include a first cell and a second cell which are connected in series with each other. Here, it is illustrated by taking a case where the charging power is 20 W and the charging voltage of each cell is 5V as an example. In order to meet the charging voltage requirements of the two series-connected cells, the output voltage/output current of the first charging channel 233 needs to be maintained at 10V/2 A. In this way, the wireless transmitter circuit generates an electromagnetic signal based on 10V/2 A. Correspondingly, the wireless receiver circuit converts the electromagnetic signal into an output voltage/output current of 10V/2 A. As the current is reduced from 4 A to 2 A, the heat generated during the power transmission is reduced accordingly. Therefore, in the embodiments of the present disclosure, multiple cells connected in series may also be used to reduce the heat generated by the wireless transmitter circuit 221 and the wireless receiver circuit 231.

In the above description, it is illustrated by taking N=2 as an example. In practice, the value of N may be 3 or a positive integer greater than 3. The more the cells are connected in series with each other, the smaller the amount of heat generated by the electric energy passing through the wireless transmitter circuit 221 and the wireless receiver circuit 231.

In an embodiment of the present disclosure, in order to ensure the charging speed and alleviate the heating phenomenon of the wireless charging signal receiving device 230, the structure of the internal battery of the wireless charging signal receiving device 230 is further modified, with multiple cells connected in series introduced. Compared with the solution adopting a single cell, the charging current required by the multiple cells is 1/N of the charging current required by the single cell (N is the number of the cells connected in series in the wireless charging signal receiving device 230) for achieving a same charging speed. In other words, under the premise of ensuring the same charging speed, the embodiments of the present disclosure can significantly reduce the magnitude of the charging current, thereby reducing the heat generated by the wireless charging signal receiving device 230 during the charging process.

In the embodiments of the present disclosure, the multiple cells may have the same or similar specifications and parameters, which is convenient for unified management and is beneficial to improve the overall performance and service life of the multiple cells. Alternatively, the specifications and parameters of the multiple cells may be different or inconsistent. And during the charging and/or power supply process, a balance circuit may be used to balance the voltage between the multiple cells.

Of course, even if the specifications and parameters of the multiple cells are the same, there may be still a situation that the voltages of the multiple cells are inconsistent. In this case, the balance circuit may also be used to balance the voltage between the multiple cells.

During the charging process, the electric energy output by the first charging channel or the second charging channel may be used to charge the multiple cells connected in series. During the power supply process, a buck circuit may be used to step down the voltage of the multiple cells to supply power to the wireless charging signal receiving device 230, or a single cell may also be used to supply power to the wireless charging signal receiving device. In addition, during the charging process, if it is needed to supply power to the wireless charging signal receiving device, one path may be allocated by the charging management circuit to supply power to the wireless charging signal receiving device.

In order to keep the power of the multiple cells balanced, power balance processing may be performed on the multiple cells by the balance circuit, during the charging and discharging processes. The balance circuit may be implemented in many ways. For example, a load may be connected at both ends of a cell to consume the power of the cell, so as to keep the power of the cell consistent with the power of other cells, and thus make the voltages of the various cells consistent with each other. Alternatively, it is possible to charge a cell having a low power with a cell having a high power until the voltages of the various cells are the same.

As mentioned above, the process of charging the battery may include one or more of a trickle charging phase, a constant current charging phase and a constant voltage charging phase. In the embodiments of the present disclosure, in order to further increase the charging speed, the charging duration of the constant voltage charging phase may be shortened or the constant voltage charging phase may be eliminated, by controlling the charging voltage and the charging current. In this way, the charging speed can be greatly improved compared with the charging processes in the related art.

In some implementations, a limit voltage Vn higher than the standard cut-off voltage of the battery may be set, and multiple charging currents [I1, I2, I3, ..., In] may be set, where n is greater than or equal to 1, and $I1 \geq I2 \geq I3 \ldots \geq In$. It should be understood that the limit voltage Vn is related to the battery system and materials used therefor. In some implementations, if the standard cut-off voltage the battery is V0, Vn may be set as V0+ΔV. For example, ΔV may be a value between 0.05V and 0.1V. The values of the charging current I1, I2, ..., In are also related to the battery system and the materials used therefor. For example, In can be 700 mA.

After the battery system is determined, the battery capacity is determined. According to the relationship among the charging voltage, charging current, charging duration and battery capacity, the charging current at different phases may be determined when the charging voltage is equal to the limit voltage Vn. In some implementations, the difference between two adjacent charging currents I1, I2, I3, . . . , In may be set as ΔI, for example, ΔI may be a value between 100 mA and 1 A.

In some implementations, no matter whether the first charging channel or the second charging channel mentioned above is used, once the battery voltage reaches the standard cut-off voltage, constant current charging is performed on the battery with the charging current I1 until the battery voltage reaches the limit voltage Vn. After the constant current charging performed on the battery with the charging current I1 is stopped, the voltage would drop at some extent. Therefore, the constant current charging may be further performed on the battery with the charging current I2, until the battery voltage reaches the limit voltage Vn. The above operations are repeated until the limit voltage Vn is reached by performing the constant current charging with the last charging current In, and then the charging may be stopped. In this way, by setting the limit voltage Vn and the charging current at various phrases, the constant voltage charging phase in the related technology can be eliminated, and the charging duration can be greatly shortened.

When the battery voltage reaches the standard cut-off voltage, the battery is charged through multiple charging stages, where each of the charging stages corresponds to a charging current, and the charging current corresponding to the previous charging stage of two adjacent charging stages is greater than the charging current corresponding to the latter charging stage of the two adjacent charging stages. In each of the charging stages, the respective charging current is utilized to perform the charging until the voltage of the battery reaches the limit voltage, where the limit voltage is greater than the standard cut-off voltage of the battery. After the multiple charging stages are finished, the charging is stopped.

In other implementations, no matter whether the first charging channel or the second charging channel mentioned above is used, once the battery voltage reaches to the standard cut-off voltage, constant current charging is performed on the battery with the charging current I1 until the battery voltage reaches the limit voltage Vn. Thereafter, the constant current charging is further performed on the battery with the charging current I2, until the battery voltage reaches the limit voltage Vn. The above operations are repeated until the limit voltage Vn is reached by performing the constant current charging with the last charging current In. Then, constant voltage charging is performed by using Vn as the charging voltage, for a preset period of time or until the charging current decreases to a preset value (for example, 100 mA). Thereafter, the charging is stopped. In this embodiment, since the charging cut-off voltage is increased, the duration in which the constant voltage charging is performed is shortened; and therefore, the charging duration can also be greatly shortened compared with the related technology.

When the battery voltage reaches the standard cut-off voltage, the battery is charged through multiple charging stages, where each of the charging stages corresponds to a charging current, and the charging current corresponding to the previous charging stage of two adjacent charging stages is greater than the charging current corresponding to the latter charging stage of the two adjacent charging stages. In each of the charging stages, the respective charging current is utilized to perform the charging until the voltage of the battery reaches the limit voltage, where the limit voltage is greater than the standard cut-off voltage of the battery. Then, constant current charging is performed on the battery with the limit voltage, until the charging current of the battery reaches a target cut-off current under the constant voltage charging or the charging duration reaches a preset duration. Thereafter, the charging is stopped.

In the case where the battery has multiple cells, in the above method, it is necessary to monitor whether the voltage of each cell reaches the standard cut-off voltage and the limit voltage. Once the voltage of any cell reaches the standard cut-off voltage or the limit voltage, the charging current used for the constant current charging is changed. Alternatively, in some implementations, a charging circuit of the cell(s) which has been fully charged may be disconnected, and other cells which have not been fully charged may continue to be charged. That is, each cell may be independently charged according to the above-mentioned charging process.

For the above-mentioned embodiments, they may be implemented in whole or in part by software, hardware, firmware or any combination thereof. For the case of being implemented by software, they may be implemented in whole or in part in the form of a computer program product. The computer program product includes one or more computer instructions. When the computer program instructions are loaded and executed on a computer, all or part of the processes or functions described in the embodiments of the present disclosure are performed. The computer may be a general-purpose computer, a special-purpose computer, a computer network, or other programmable devices. The computer instructions may be stored in a computer-readable storage medium, or transmitted from one computer-readable storage medium to another computer-readable storage medium. For example, the computer instructions may be transmitted from a website, computer, server, or data center to another website, computer, server or data center via wired (such as coaxial cable, optical fiber, Digital Subscriber Line (DSL)) or wireless (such as infrared, wireless and microwave) communication. The computer-readable storage medium may be any available medium that can be accessed by the computer, or a data storage device such as a server or data center incorporated with one or more available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)), or the like.

Those ordinary skilled in the art may understand that, the units and algorithm operations of the examples described in combination with the embodiments disclosed herein can be implemented by electronic hardware or a combination of computer software and electronic hardware, depending on the specific application and design constraint conditions of the technical solution. For each specific application, professionals and technicians may use different ways to implement the described functions, but such implementation should not be considered as going beyond the scope of this disclosure.

In the several embodiments provided in this disclosure, it should be understood that the disclosed system, device and method may be implemented in other ways. For example, the device embodiments described above are merely illustrative. For example, the division of the units is only performed in terms of the logical function, and there may be other divisions in actual implementations. For example, multiple units or components may be combined or integrated into another system, or some features may be omitted or not implemented. In addition, the shown or discussed mutual coupling or direct coupling or communication connection may be indirect coupling or communication connection through some interfaces, devices or units, and may be electrical, mechanical or in other forms.

The units described as discrete components may or may not be physically separated. The components displayed as units may or may not be physical units. They may be located in one place, or they may be distributed on multiple network units. Some or all of the units may be selected as required to achieve the objectives of the solutions of the embodiments.

In addition, the functional units in the various embodiments of the present disclosure may be integrated into one processing unit, or each unit may exist alone physically, or two or more units may be integrated into one unit.

The foregoing are only specific implementations of this disclosure, but the protection scope of this disclosure is not limited thereto. Variants or substitutions, which can be easily conceived by any person skilled in the art within the technical scope disclosed in this disclosure, should be covered by the protection scope of this disclosure. Therefore, the protection scope of this disclosure should be subject to the protection scope of the claims.

What is claimed is:

1. A wireless charging control method, comprising:
   acquiring an output voltage of a wireless receiver circuit, and acquiring a wireless charging signal received by the wireless receiver circuit;
   acquiring a first charging power of a battery, the first charging power of the battery being a charging power currently required by the battery;
   sending, to a transmitting device transmitting the wireless charging signal, instruction information to instruct the transmitting device to increase a transmit voltage, in response to determining the output voltage of the wireless receiver circuit does not reach a target voltage, the target voltage indicating an output voltage of the wireless receiver circuit that enables the first charging power of the battery to be met;
   determining that a power of the wireless charging signal fails to meet the first charging power of the battery, in response to determining that the output voltage of the wireless receiver circuit still fails to reach the target voltage after the transmitting device has been instructed to increase the transmit voltage; and
   reducing the first charging power of the battery, in response to determining, according to the output voltage of the wireless receiver circuit, that the power of the wireless charging signal fails to meet the first charging power of the battery.

2. The method as claimed in claim 1, wherein determining that the output voltage of the wireless receiver circuit still fails to reach the target voltage after the transmitting device has been instructed to increase the transmit voltage, comprises:
   determining that the output voltage of the wireless receiver circuit still fails to reach the target voltage after the transmitting device has been instructed at least twice to increase the transmit voltage.

3. The method as claimed in claim 1, wherein the instruction information indicates a difference between the target voltage and the output voltage of the wireless receiver circuit.

4. The method as claimed in claim 1, wherein the instruction information is carried in a control error packet (CEP).

5. The method as claimed in claim 1, wherein the method further comprises:
   determining that a charging control device is misaligned with respect to the transmitting device transmitting the wireless charging signal, in response to determining that the power of the wireless charging signal fails to meet the first charging power of the battery, the wireless receiver circuit and the battery being comprised in the charging control device.

6. The method as claimed in claim 1, wherein reducing the first charging power of the battery, in response to determining that the power of the wireless charging signal fails to meet the first charging power of the battery, comprises:
   reducing the first charging power of the battery, in response to determining that the power of the wireless charging signal fails to meet the first charging power of the battery for a preset period of time.

7. The method as claimed in claim 1, wherein reducing the first charging power of the battery comprises:
   reducing gradually a charging current currently required by the battery, in such a manner that the charging current currently required by the battery is reduced by a certain amount each time, until the power of the wireless charging signal can meet the first charging power of the battery.

8. The method as claimed in claim 1, wherein after the first charging power of the battery is reduced, the method further comprises:
   increasing the charging current currently required by the battery from a current charging current to a target charging current; and
   maintaining the charging current currently required by the battery at the current charging current, in response to determining that the power of the wireless charging signal fails to meet the target charging current.

9. The method as claimed in claim 8, wherein increasing the charging current currently required by the battery from a current charging current to a target charging current comprises:
   increasing gradually the charging current currently required by the battery to the target charging current in such a manner that the charging current currently required by the battery is increased by a certain amount each time.

10. The method as claimed in claim 8, wherein the target charging current is a maximum charging current required by the battery.

11. A charging control device, comprising:
    a wireless receiver circuit, configured to receive a wireless charging signal; and
    a communication control circuit, configured to:
       determine, according to an output voltage of the wireless receiver circuit, whether a power of the wireless charging signal can meet a first charging power of a battery, the first charging power of the battery being a charging power currently required by the battery;
       send, to a transmitting device transmitting the wireless charging signal, instruction information to instruct the transmitting device to increase a transmit voltage, in response to determining that the output voltage of the wireless receiver circuit does not reach a target voltage, and the target voltage indicating an output voltage of the wireless receiver circuit that enables the first charging power of the battery to be met;
       determine that the power of the wireless charging signal fails to meet the first charging power of the battery, in response to determining that the output voltage of the wireless receiver circuit still fails to reach the target voltage after the transmitting device has been instructed to increase the transmit voltage; and reduce the first charging power of the battery, in response to determining that the power of the wireless charging signal fails to meet the first charging power of the battery.

12. The charging control device as claimed in claim 11, wherein the communication control circuit is configured to:
   reduce a charging current currently required by the battery in such a manner that the charging current currently required by the battery is reduced by a certain amount each time, until the power of the wireless charging signal can meet the first charging power of the battery.

13. The charging control device as claimed in claim 11, wherein after the first charging power of the battery is reduced, the communication control circuit is further configured to:
   increase the charging current currently required by the battery from a current charging current to a target charging current; and
   maintain the charging current currently required by the battery at the current charging current, in response to determining that the power of the wireless charging signal fails to meet the target charging current.

14. The charging control device as claimed in claim 11, wherein the transmitting device transmitting the wireless charging signal supports a first wireless charging mode and a second wireless charging mode, a charging speed at which the battery of the charging control device is charged in the first wireless charging mode is faster than a charging speed at which the battery is charged in the second wireless charging mode, and the communication control circuit is further configured to:
   negotiate, with the transmitting device, whether to use the first wireless charging mode or the second wireless charging mode for charging.

15. The charging control device as claimed in claim 11, wherein the communication control circuit is further configured to control, according to a charging mode, switching between a first charging channel and a second charging channel of the charging control device.

16. A charging control device, comprising:
   a wireless receiver circuit, configured to receive a wireless charging signal;
   a detection circuit, configured to detect an output voltage of the wireless receiver circuit, the output voltage of the wireless receiver circuit being converted from the wireless charging signal;
   a battery, configured to be charged by the output voltage of the wireless receiver circuit; and
   a communication control circuit, configured to:
      compare the output voltage of the wireless receiver circuit with a target voltage, the target voltage indicating an output voltage of the wireless receiver circuit that enables a first charging power of the battery to be met, the first charging power of the battery being a charging power currently required by the battery;
      send, to a transmitting device transmitting the wireless charging signal, instruction information to instruct the transmitting device to increase a transmit voltage, in response to determining that the output voltage of the wireless receiver circuit is less than the target voltage for a preset period of time; and
      reduce the first charging power of the battery, in response to determining that the output voltage of the wireless receiver circuit is still less than the target voltage after the transmitting device has been instructed to increase the transmit voltage.

* * * * *